United States Patent
Park et al.

(10) Patent No.: US 12,261,336 B2
(45) Date of Patent: Mar. 25, 2025

(54) MICROBIAL FUEL CELL USING ELECTRON ABSORBER HAVING HIGH REDUCTION POTENTIAL, AND METHOD OF GENERATING ELECTRIC ENERGY USING SAME

(71) Applicant: Yong Hak Park, Seoul (KR)

(72) Inventors: Yong Hak Park, Seoul (KR); Chan Soo Choi, Seoul (KR)

(73) Assignee: Yong Hak Park, Seoul (KR)

( * ) Notice: Subject to any disclaimer, the term of this patent is extended or adjusted under 35 U.S.C. 154(b) by 98 days.

(21) Appl. No.: 17/769,382

(22) PCT Filed: Oct. 13, 2020

(86) PCT No.: PCT/KR2020/013913
§ 371 (c)(1),
(2) Date: Apr. 15, 2022

(87) PCT Pub. No.: WO2021/075816
PCT Pub. Date: Apr. 22, 2021

(65) Prior Publication Data
US 2024/0136560 A1  Apr. 25, 2024
US 2024/0234778 A9  Jul. 11, 2024

(30) Foreign Application Priority Data
Oct. 15, 2019 (KR) .................. 10-2019-0127717

(51) Int. Cl.
*H01M 8/16* (2006.01)
*C25B 1/04* (2021.01)
(Continued)

(52) U.S. Cl.
CPC ............. *H01M 8/16* (2013.01); *C25B 1/04* (2013.01); *C25B 11/061* (2021.01);
(Continued)

(58) Field of Classification Search
CPC ................ H01M 8/16; H01M 8/2459; H01M 2300/0028; H01M 2004/8684;
(Continued)

(56) References Cited

U.S. PATENT DOCUMENTS

2014/0083933 A1   3/2014   Choi

FOREIGN PATENT DOCUMENTS

| JP | H07-316864 A | 12/1995 |
| KR | 10-2012-0124529 A | 11/2012 |

(Continued)

OTHER PUBLICATIONS

International Search Report from corresponding PCT Application No. PCT/KR2020/013913, dated Jan. 18, 2021.
(Continued)

*Primary Examiner* — Sarah A. Slifka
(74) *Attorney, Agent, or Firm* — Harness, Dickey & Pierce, P.L.C.

(57) ABSTRACT

The present invention relates to a microbial fuel cell using an electron absorber having high reduction potential, and a method of generating electric energy using same, and more specifically, to: a microbial fuel cell in which an electron absorber solution having high reduction potential is used as a reduction electrolyte, an organic solution that is an electron donor is used as an oxidization electrolyte, the reduced reduction electrolyte is regenerated through electrolysis in an electrolysis battery and re-supplied to the reduction electrolyte, a separation membrane provided with one or more O-rings in order to prevent leakage is included, hydrogen gas generated from the electrolysis can be supplied to a fuel cell to generate additional electric energy, such that a large quantity of electric power can be generated cost-efficiently, energy from an existing electricity generation system, such as solar electric energy.

14 Claims, 13 Drawing Sheets

(51) Int. Cl.
*C25B 11/061* (2021.01)
*C25B 11/077* (2021.01)
*H01M 4/86* (2006.01)
*H01M 4/96* (2006.01)
*H01M 8/0289* (2016.01)
*H01M 8/24* (2016.01)

(52) U.S. Cl.
CPC .............. *C25B 11/077* (2021.01); *H01M 4/96* (2013.01); *H01M 8/0289* (2013.01); *H01M 8/2459* (2016.02); *H01M 2004/8684* (2013.01); *H01M 2004/8689* (2013.01); *H01M 2300/0028* (2013.01)

(58) Field of Classification Search
CPC ......... H01M 2004/8689; C25B 11/061; C25B 11/077; C25B 1/04
See application file for complete search history.

(56) References Cited

FOREIGN PATENT DOCUMENTS

| KR | 10-2017-0031352 A | 3/2017 |
|---|---|---|
| KR | 10-2017-0142753 A | 12/2017 |
| KR | 10-2019-0032999 A | 3/2019 |

OTHER PUBLICATIONS

Wang, H., et al.; "A comprehensive review of microbial electrochemical systems as a platform technology", Biotechnology Advances 31 (2013) 1796-1807.

Harnisch, F., et al.; "From MFC to MXC: chemical and biological cathodes and their potential for microbial bioelectrochemical systems", Chem. Soc. Rev., 2010, 39, 4433-4448.

Ieropoulos, I., et al.; "Artificial Metabolism: Towards True Energetic Autonomy in Artificial Life", ECAL 2003, LNAI 2801, pp. 792?799, 2003.

Ucar, D., et al.; "An Overview of Electron Acceptors in Microbal Fuel Cells", An Overview of Electron Acceptors in Microbial Fuel Cells. Front. Microbiol. 8:643, 2017, pp. 1-14.

Pant, D., et al.; "A review of the substrates used in microbial fuel cells (MFCs) for sustainable energy production", Bioresource Technology 101 (2010) 1533-1543.

Gil, G., et al.; "Operational parameters affecting the performance of a mediator-less microbial fuel cell", Biosensors and Bioelectronics 18 (2003) 327-/334.

He, C., et al.; "Electron acceptors for energy generation in microbial fuel cells fed with wastewaters: A mini-review", Chemosphere, 2015, pp. 1-6.

Ibanez, J. G., et al.; "Aqueous Redox Transition Metal Complexes for Electrochemical Applications as a Function of pH", Polyaniline Films on Electrodes, vol. 134, No. 12, 1987, pp. 3083-3089.

Choi, C., et al.; "Recovery of silver from wastewater coupled with power generation using a microbial fuel cell", Bioresource Technology 107 (2012) 522-525.

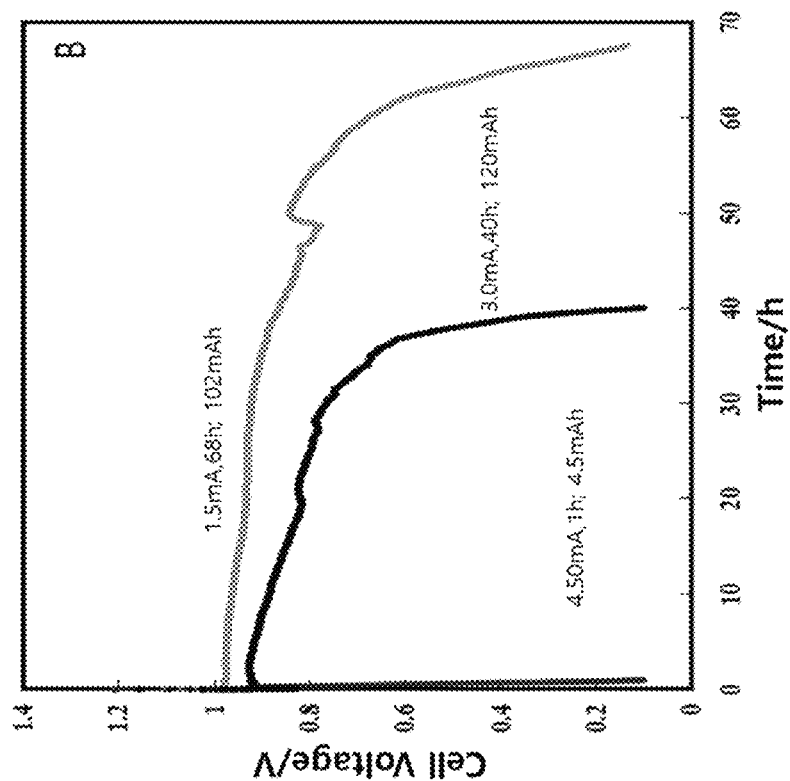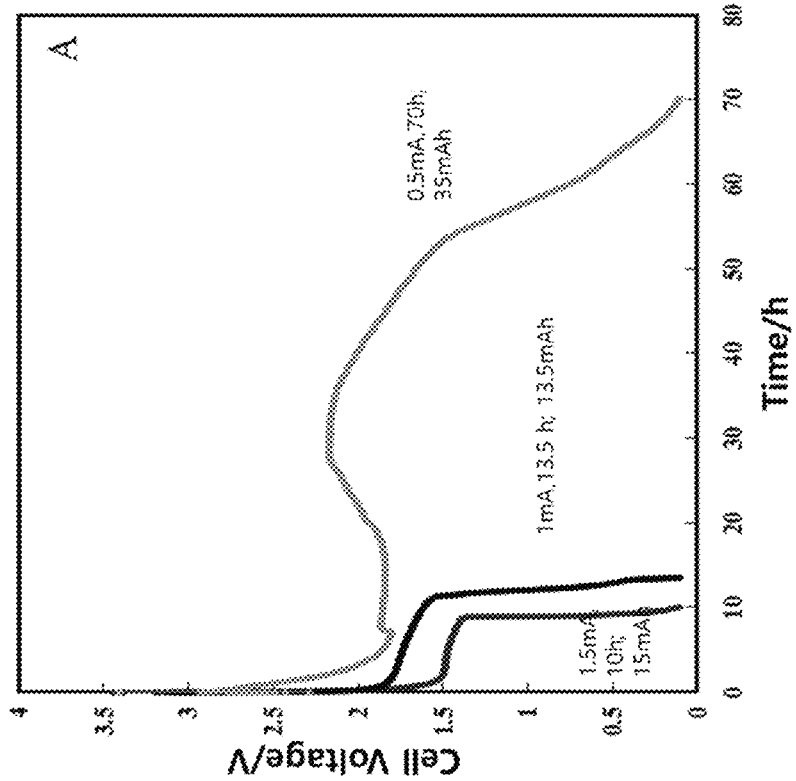
FIG. 5

A: 0.05 mA discharge current
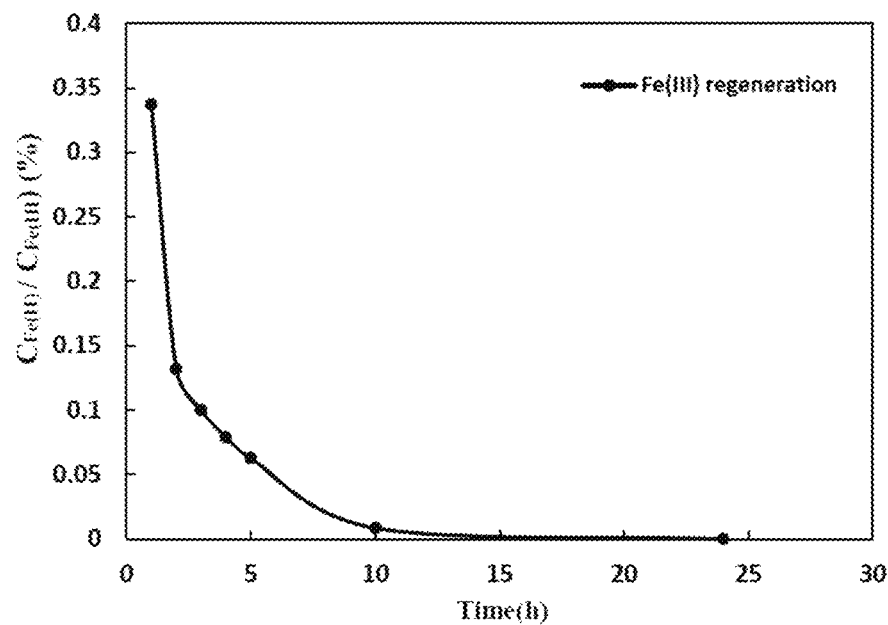
B: 0.01 mA discharge current
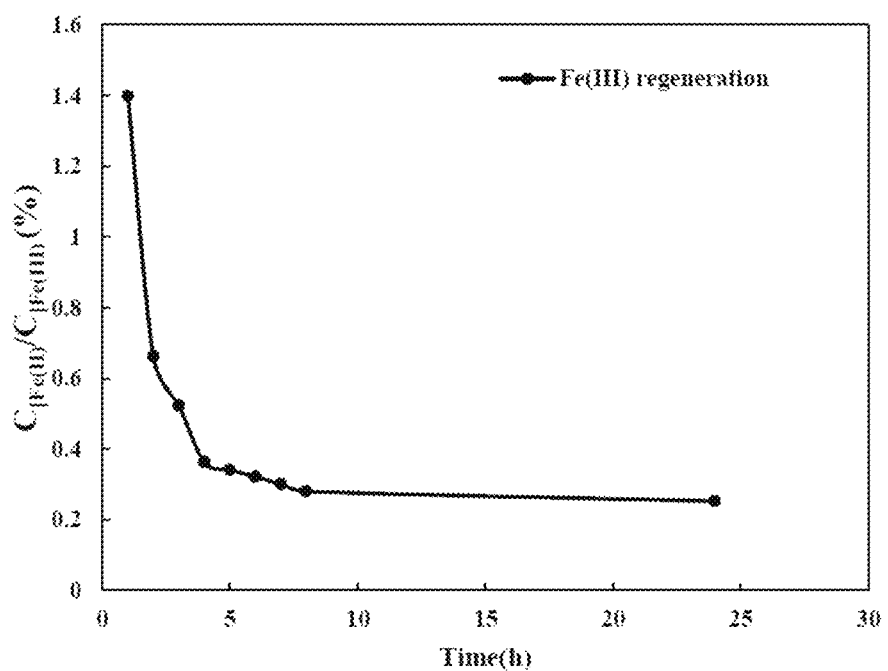
FIG. 12

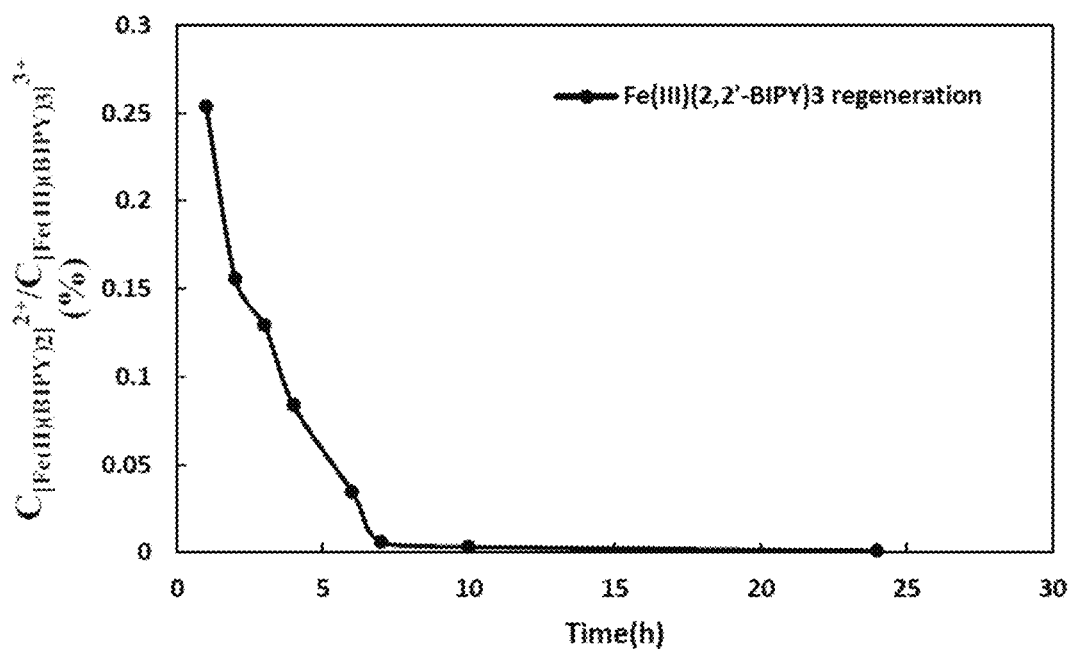
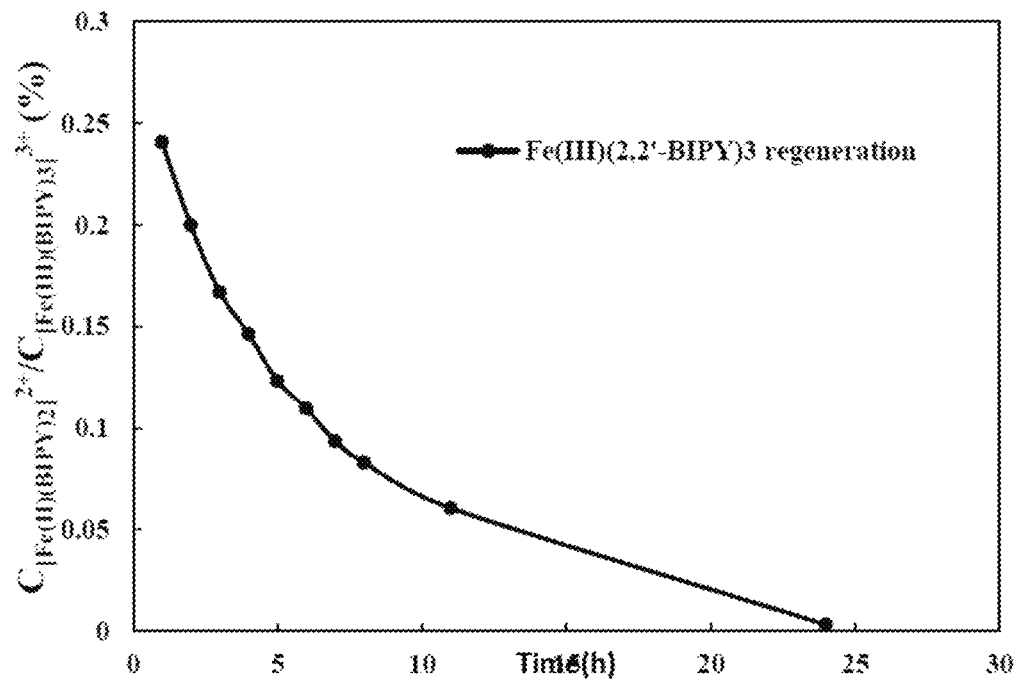
FIG. 13

A: 0.05 mA discharge current
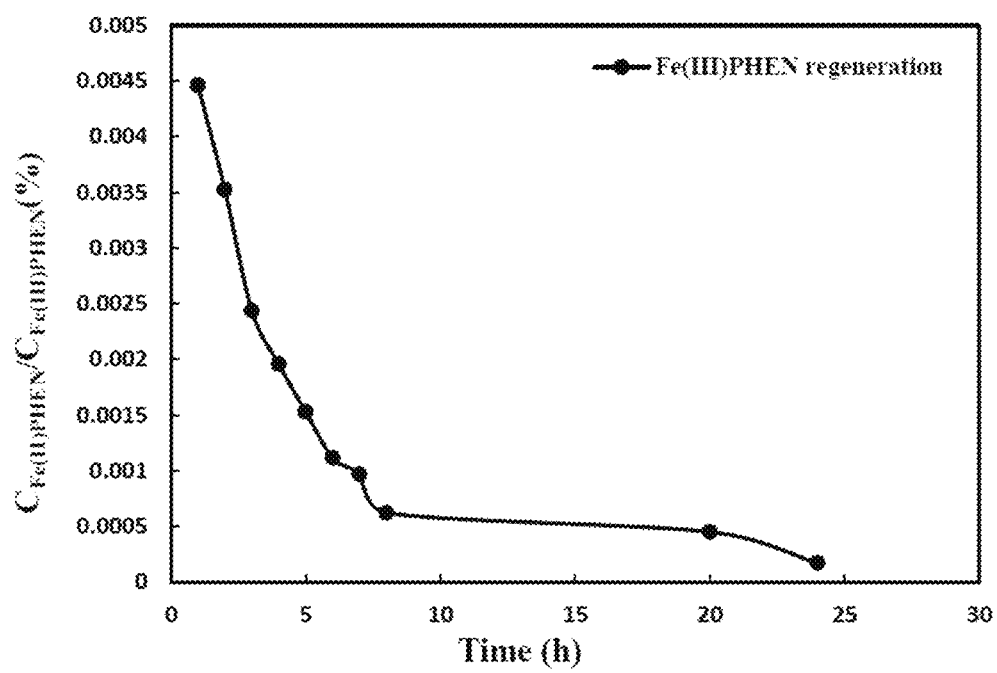
B: 0.01 mA discharge current
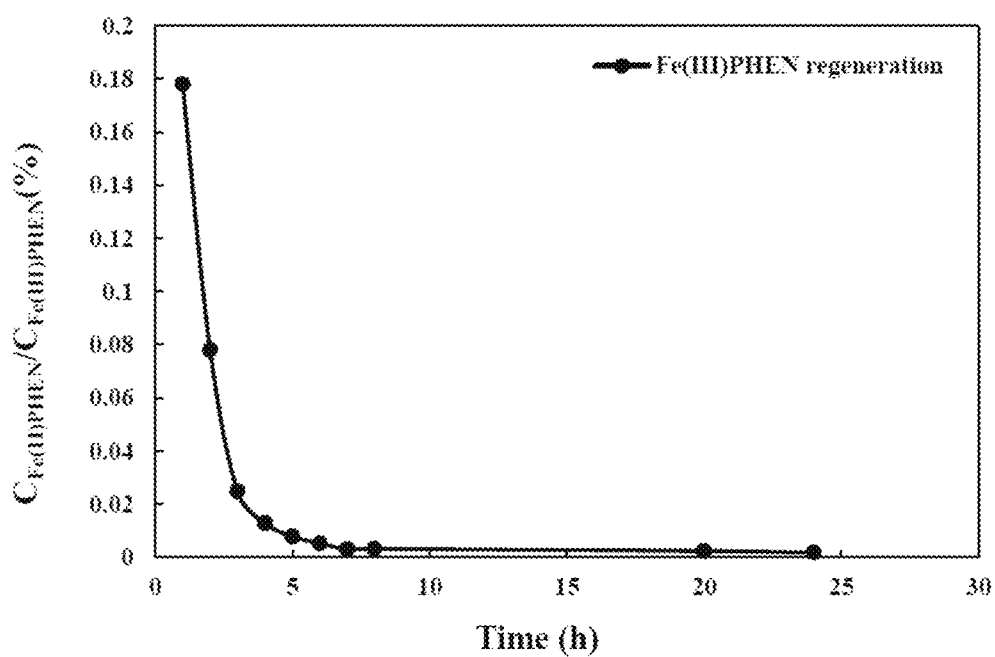
FIG. 14

MICROBIAL FUEL CELL USING ELECTRON ABSORBER HAVING HIGH REDUCTION POTENTIAL, AND METHOD OF GENERATING ELECTRIC ENERGY USING SAME

CROSS-REFERENCE TO RELATED APPLICATIONS

This application is a national phase application of PCT Application No. PCT/KR2020/013913, filed on Oct. 13, 2020, which claims the benefit and priority to Korean Patent Application No. 10-2019-0127717, filed on Oct. 15, 2019. The entire disclosures of the applications identified in this paragraph are incorporated herein by references.

TECHNICAL FIELD

The present invention relates to a microbial fuel cell using an electron absorber having high reduction potential and a method for producing electric energy using the same. More specifically, the present invention relates to a microbial fuel cell wherein an electron absorber solution having high reduction potential is used as a posolyte, an organic solution which is an electron donor is used as a negolyte, the reduced posolyte is regenerated through electrolysis in electrolysis electricity and is supplied to the posolyte again, a separation membrane equipped with one or more O-rings is included to prevent leakage, hydrogen gas generated from electrolysis can be supplied to a fuel cell to produce additional electrical energy, which can produce high power at an efficient cost, energy from an existing electricity production system, such as solar electric energy, or electric power generated from a microbial fuel cell can be used for electrolysis to improve energy utilization and the lifespan of fuel cells can be extended, and a method for producing electric energy using the same.

BACKGROUND ART

Microbial fuel cells (MFCs) have been studied over the past few decades as a sustainable alternative energy production and as a useful resource for water treatment and decontamination. MFCs convert chemical energy stored in biodegradable materials into useful electrical energy.

Furthermore, the electrical current can be used for many other functions, including operating a microbial electrolysis cell or decontamination of water in a microbial decontamination cell (Wang, H.; Ren, Z. J. A comprehensive review of microbial electrochemical systems as a platform technology. Biotechnol. Adv. 2013, 31 (8), 1796-1807; Harnisch, F.; Schroder, U. From MFC to MEC: Chemical and biological cathodes and their potential for microbial bioelectrochemical systems. Chem. Soc. Rev. 2010, 39 (11), 4433-4448).

Applications related to energy harvesting and utilization have also been reported by Ioannis Ieropoulos et al. (I. A. Ieropoulos, C. Melhuish, J. Greenman. Artificial metabolism towards true energetic autonomy in artificial life. European conference in artificial life. Lect. Notes Artif. Intell., 2801 (2003), pp. 792-799).

They are reported as the first robots to be powered directly by an MFC injected with glucose, without using any other form of conventional power source.

Despite these promising results, the progress of MFCs has been hampered by several limitations.

The power generation of MFCs depends on several factors such as lipid type, electron emitting microorganisms, circuit resistance, electrode material, reactor type and electron absorber (Deniz Ucar, Yifeng Zhang and Irini Angelidaki. An Overview of Electron Acceptors in Microbial Fuel Cells. Front Microbiol. 2017; 8: 643; Pant D, Van Bogaert G., Diels L., Vanbroekhoven K. A review of the substrates used in microbial fuel cells (MFCs) for sustainable energy production. Bioresour. Technol. 2010 March; 101(6): 1533-43).

Oxygen is an ideal electron acceptor for use in MFCs due to its high reduction potential and low cost.

However, the reduction of oxygen occurs at a very slow rate on the surface of the carbon electrode, resulting in a high overvoltage, which is one of the limiting factors in the high current density MFC (Gil, G. C.; Chang, I. S.; Kim, B. H.; Kim, M.; Jang, J. K.; Park, H. S.; Kim, H. J. Operational parameters affecting the performance of a mediator-less microbial fuel cell. Biosens. Bioelectron. 2003, 18, 327-334).

To overcome this problem, various high-reduction potential metal ions were used as electron absorbers in the posolyte.

Recently, Deniz Ucar, Chuan-Shu He, et al. reviewed the performance and applicability of various electron absorbers used in MFCs (Deniz Ucar, Yifeng Zhang, and Irini Angelidaki. An Overview of Electron Acceptors in Microbial Fuel Cells. Front Microbiol. 2017; 8: 643; Chuan-Shu He, Zhe-Xuan Mu, Hou-Yun Yang, Ya-Zhou Wang, Yang Mu, Han-Qing Yu. Electron acceptors for energy generation in microbial fuel cells fed with wastewaters: A mini-review. Chemosphere (2015)).

Different electron absorbers have different reduction potential, which is why they affect the efficiency of electricity production.

Therefore, the use of new electron absorbers in MFCs has an important effect on electricity production (J. G. Ibanez, C. S. Choi, R. S. Becker, Electrochemical Applications of Aqueous Redox Transition Metal Complexes as a Function of pH. J. Electrochem. Soc. 134, 12 (1987), 3084-3087).

The present inventors have applied for a method for manufacturing a device for storing and using new renewable energy using a microbial fuel cell as Korean Patent Application No. 10-2015-0128739.

Although the above patent has improved current efficiency, voltage efficiency and energy efficiency compared to the conventional microbial fuel cell, there is still a need for a microbial fuel cell with excellent power production performance.

SUMMARY

Problems to be Solved

The purpose of the present invention is to provide a microbial fuel cell wherein an electron absorber solution having high reduction potential is used as a posolyte, an organic solution which is an electron donor is used as a negolyte, the reduced posolyte is regenerated through electrolysis in electrolysis electricity and is supplied to the posolyte again, a separation membrane equipped with one or more 0-rings is included to prevent leakage, hydrogen gas generated from electrolysis can be supplied to a fuel cell to produce additional electrical energy so that high power can be produced at an efficient cost, energy from an existing electricity production system such as solar electric energy or electric power generated from a microbial fuel cell can be used for electrolysis to improve energy utilization and the lifespan of fuel cells can be extended, and a method for producing electric energy using the same.

Technical Means

In order to achieve the technical purpose, the present invention provides a microbial fuel cell comprising an anode chamber, a cathode chamber, a separation membrane positioned between the anode chamber and the cathode chamber, and an electrolysis cell, wherein the anode chamber comprises an anode on which a microbial film is formed on the surface and an organic solution that is an electron donor as a negolyte, and the organic solution is continuously supplied to the anode chamber, the cathode chamber comprises a cathode which is a conductor electrode on which a microbial film is not formed on the surface, and an electron absorber solution as a posolyte, the electrolysis cell comprises a cathode and an anode to which power is applied, and the reduced posolyte transferred from the cathode chamber, the reduced posolyte transferred from the cathode chamber is regenerated through electrolysis using external power, and the regenerated posolyte is supplied back to the cathode chamber, hydrogen gas generated in the cathode chamber due to the electrolysis performed in the electrolysis cell is discharged to the outside of the electrolysis cell and the separation membrane is provided with one or more O-rings that can prevent leakage.

In another aspect, the present invention provides a method for producing electrical energy using the above microbial fuel cell.

Effect of the Invention

The microbial fuel cell according to the present invention can produce high power at an efficient cost by using as a posolyte, an electron acceptor such as Fe(III)(4,4-dimethyl-2,2'-bipyridyl)$_3$, Fe(III)(2,2'-bipyridyl)$_3$, Fe(III)(2,2'-bipyridine-4,4'-disulfonate)$_3$, Fe(III)(2,2'-bipyridine-5-sulfonate)$_3$, Fe(III)(4,4'-bis(triethylammoniummethyl)-2,2'-bipyridine)$_3$, Fe(III)(triethylammonium-2,2'-bipyridine)$_3$, Fe(III)(2,2'-bipyridine-5,5'-dicarboxylic acid)$_3$, Fe(III)(1,10-phen)$_3$, Ru(III)(2,2'-bipyridine)$_3$, Ru(III)(4,4'-bis(triethylammoniummethyl)-2,2'-bipyridine)$_3$, 4-trimethylammonium-2,2,6,6-tetramethylpiperidine-1-oxyl-iodide, 2,2,6,6-tetramethylpiperidine-1-oxyl sulfonate, sodium salt, TEMPO-4-sulfate, potassium salt, 4-[3-(trimethylammonium)propoxy]-2,2,6,6-tetramethylpiperidine-1-oxyl chloride, (2,2,6,6-tetramethylpiperidine-1-yl)-oxyl copolymer, poly(TEMPO), 4-hydroxy 2,2,6,6-tetramethylpiperidine-1-oxyl, 4-amino-2,2,6,6-tetramethyl piperidine-1-oxyl, 2,2,6,6-tetramethylpiperidine-1-oxyl, 4-carboxy-2,2,6,6-tetramethyl piperidine-1-oxyl, 3-carbamido-2,2,5,5-tetramethyl-3-carbamido-3-pyroline-1-oxyl, phthalimide-N-oxyl, N,N,N-2,2,6,6-heptamethylpiperidine-oxy-4-ammonium dichloride, poly(TEMPO-CO-PEGMA), 4,5-dihydroxy-1,3-benzenedisulfonate disodium, 3,6-dihydroxy-2,4-dimethylbenzenesulfonate, sodium salt, N-hydroxyimide derivatives, (ferrocenylmethyl)trimethylammonium chloride, bis[(trimethylammonium)propyl]ferrocene, bis(3-trimethylaminopropyl)-ferrocene dichloride, ferrocene amine chloride, ferrocene dinitrogen dibromide, $Br_2$, $I_3$—, $Mn^{3+}$, etc. which has high reduction potential and high solubility in aqueous solution at the cathode and a low overpotential at the electrode. The electron acceptor uses redox pairs having various charges, such as heavy metals, complexes thereof and organic materials, and regenerates them so that they can be used continuously. [All electron acceptors that have high reduction potential, solubility and stability and make neutral aqueous solutions can be used.]

Since the reducing electrolyte caused by the discharge of the fuel cell can be regenerated and utilized through electrolysis using external power such as solar cells or wind power cells, it can more than double the utilization of energy from existing electricity generation systems, such as solar electricity. Hydrogen gas, a byproduct of electrolysis, can be supplied to a fuel cell to produce electric energy, or hydrogen gas can be directly used as a fuel.

In addition, the microbial fuel cell according to the present invention can use organic solution such as food wastewater, domestic wastewater, anaerobic sludge from a wastewater treatment plant and algal plants as an oxidizing electrolyte, so that the fuel of the fuel cell can be used for free or at low cost and the benefits of purification can also be utilized at the same time.

In addition, the microbial fuel cell according to the present invention uses a separation membrane having one or more O-rings, thereby preventing water leakage and improving the lifespan of the battery, so that an almost permanent fuel cell can be manufactured.

Electric energy can be produced at low cost by using the microbial fuel cell of the present invention as described above. In addition, the combined cell of the microbial fuel unit cells connected in series or parallel can achieve doubling of current and boosting of voltage. By using this, most heavy metals such as rare earths, which are difficult to recover due to their low reduction potential, can be removed or recovered.

BRIEF DESCRIPTION OF THE DRAWINGS

FIG. 5 is a graph showing (A) discharging curves of the battery comprising 3 unit MFCs with series connection and (B) discharging curves of the battery comprising 3 unit MFCs with parallel connection (wherein, cathode is graphite plate (2.5 cm×6 cm), posolyte is 170 mL of 5000 ppm Cr(VI), anode is carbon brush (D 4 cm, H 7 cm) and negolyte is 2 g/L acetate and 0.2 g/L yeast extract dissolved in PBS).

FIG. 12 is a graph showing a ratio of Fe(II)/Fe(III) with time in converting Fe(II) to Fe(III) in the anode chamber by applying power with a constant current of (A) 0.05 mA and (B) 0.01 mA (wherein, Fe(III) regeneration rate; a solution of 5000 ppm Fe(III) and 0.1 M Na$_2$SO$_4$, NaHSO$_4$ (180 mL) (pH 2). The posolyte is 180 mL of 0.1 M 0.1 M Na$_2$SO$_4$, NaHSO$_4$).

FIG. 13 is a graph showing a ratio of Fe(III)(2,2'-bipy)$_2$ and Fe(II)(2,2'-bipy)$_3$ with time in converting Fe(III)(2,2'-bipy)$_2$ to Fe(II)(2,2'-bipy)$_3$ in the anode chamber by applying power with a constant current of (A) 0.05 mA and (B) 0.01 mA (wherein, the regeneration rate of Fe(III)(2,2'-bipy)$_3$; a solution of 5000 ppm Fe(III)(2,2'-bipy)$_3$ and 0.1 M Na$_2$SO$_4$, NaHSO$_4$ (180 mL) (pH 2). The posolyte is 180 mL of 0.1 M Na$_2$SO$_4$, NaHSO$_4$).

FIG. 14 is a graph showing a ratio of Fe(III)(PHEN)$_2$/Fe (III)(PHEN)$_3$ with time in converting Fe(III)(PHEN)$_2$ to Fe(III)(PHEN)$_3$ in the anode chamber by applying power with a constant current of (A) 0.05 mA and (B) 0.01 mA (wherein, the regeneration rate of Fe(III)(PHEN)$_3$; a solution of 5000 ppm Fe(III)(PHEN)$_3$ in 0.1 M Na$_2$SO$_4$, NaHSO$_4$ (180 mL) (pH 2). The posolyte is 180 mL of 0.1 M Na$_2$SO$_4$, NaHSO$_4$).

DETAILED DESCRIPTION

Figure 1:
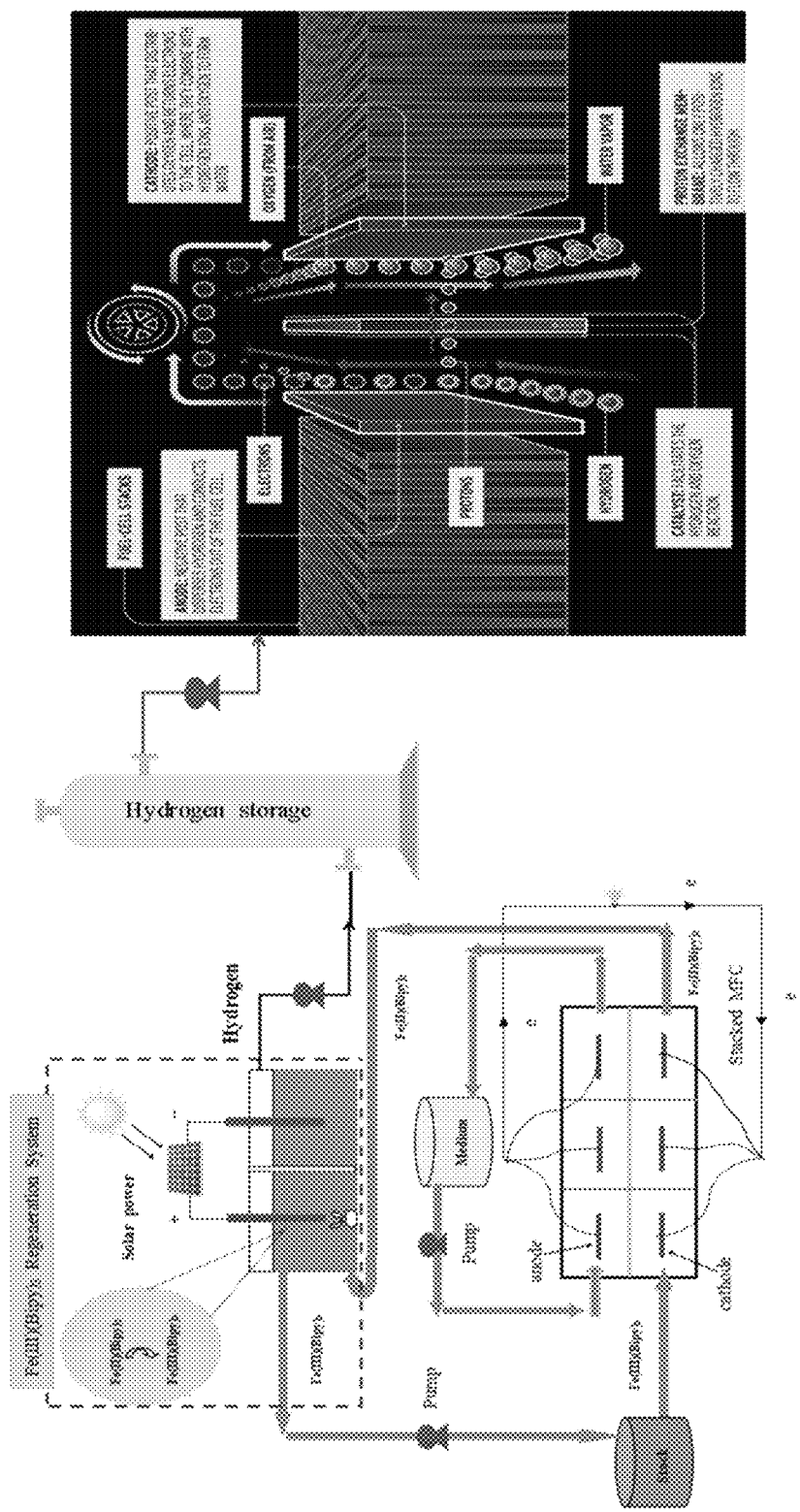
FIG. 1 is a schematic diagram showing the electrolysis cell of the present invention which regenerates the posolyte, which is an electron absorber, by using the power of the solar cell and produces hydrogen gas, and an aspect of power generation of the above microbial fuel cells connected in parallel and hydrogen-oxygen fuel cell using hydrogen gas produced in electrolysis cell.

The present invention is explained in more detail below.

A microbial fuel cell of the present invention comprises an anode chamber, a cathode chamber, a separation membrane positioned between the anode chamber and the cathode chamber, and an electrolysis cell, wherein the anode chamber comprises an anode on which a microbial film is formed on the surface and an organic solution that is an electron donor as a negolyte, and the organic solution is continuously supplied to the anode chamber, the cathode chamber comprises a cathode which is a conductor electrode on which a microbial film is not formed on the surface, and an electron absorber solution as a posolyte, the electrolysis cell comprises a cathode and an anode to which power is applied, and the posolyte transferred from the cathode chamber, the posolyte transferred from the cathode chamber is regenerated through electrolysis using external power, and the regenerated posolyte is supplied back to the cathode chamber, hydrogen gas generated in the cathode chamber due to the electrolysis performed in the electrolysis cell is discharged to the outside of the electrolysis cell and the separation membrane is provided with one or more O-rings that can prevent leakage.

The purpose of the present invention is to provide a microbial fuel cell which is able to produce high power at an efficient cost, and to use energy from an existing electricity production system such as solar electric energy or power generated from a microbial fuel cell for electrolysis to improve energy utilization, and to improve the lifespan of the fuel cell. In order to achieve this purpose, heavy metal ions and complexes thereof or other inorganic or organic materials having high reduction potential with good solubility may be used.

When the microbial fuel cell is discharged, there is a problem in regenerating and reusing the discharged posolyte. For this, the use of an external power source is required. For this purpose, the power applied to the electrolysis cell may be selected from the group consisting of power generated from the microbial fuel cell, solar power, wind power, late-night electricity and combinations thereof.

In one embodiment, the posolyte discharged in the microbial cell is put into the anode chamber of the electrolysis cell (or electrolysis tank), and the electrolyte is put in the counter electrode chamber to reduce water, and solar power can be applied between the two electrodes. In this electrolysis tank, hydrogen gas is produced in the cathode chamber of the electrolysis tank along with the return of regenerated posolyte required for the microbial fuel cell. As can be seen from FIG. 1, when it is supplied to a hydrogen-oxygen fuel cell, electrical energy can also be produced. With the help of solar power, materials necessary for a microbial fuel cell and a hydrogen-oxygen fuel cell are supplied to produce two forms of electric powers with one energy source of solar power, and these necessary materials can be stored and generated when needed.

Figure 2:
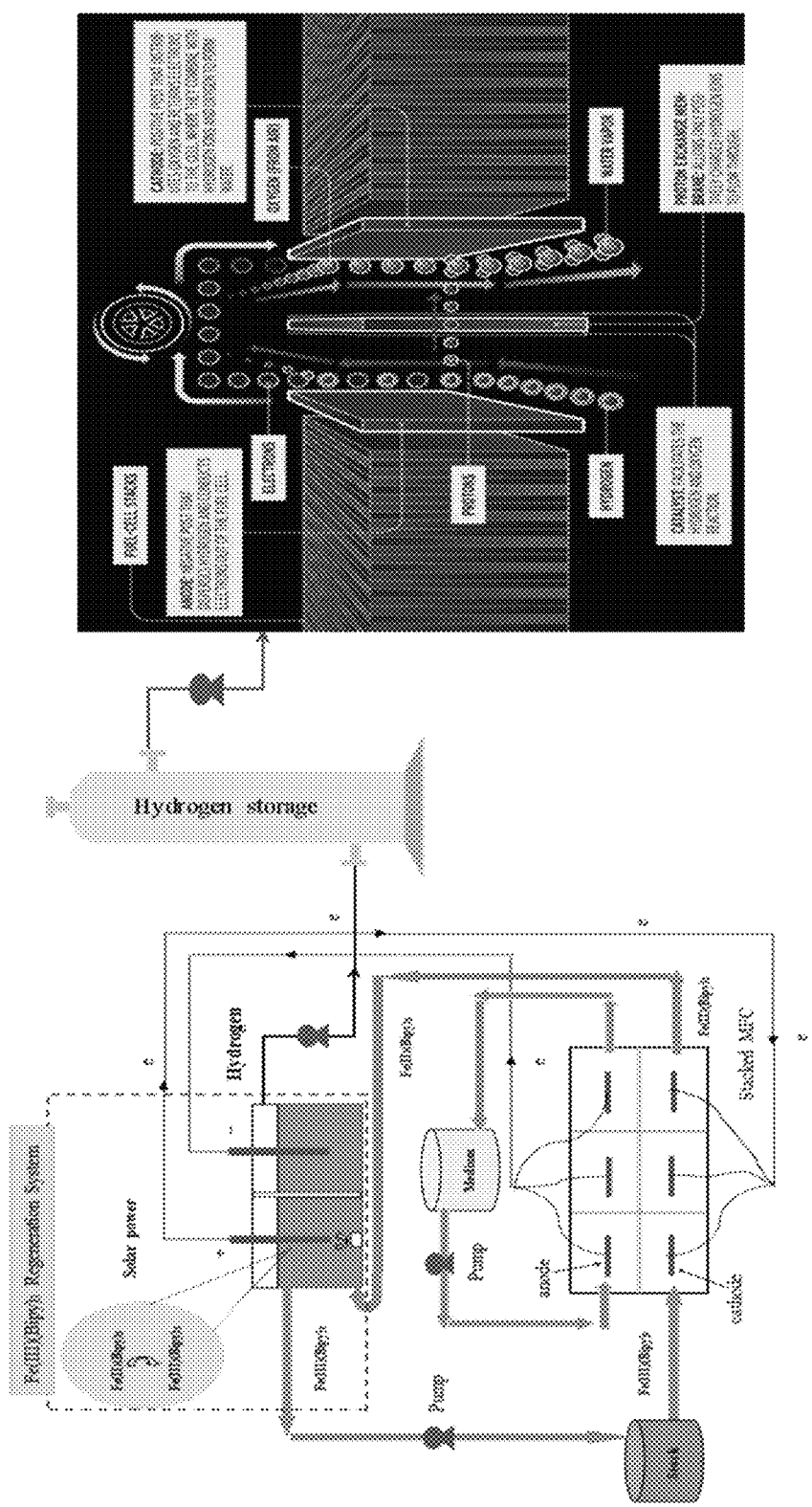
FIG. 2 is a schematic diagram showing the microbial fuel cell of the present invention (here, the microbial fuel cell is used for the purpose of producing inexpensive hydrogen gas) that directly connects the power of the microbial fuel cell to the electrolysis cell without using the power of the solar cell, regenerates the posolyte as an electron absorber, and returns it to the cathode chamber, and an aspect of power generation of the microbial fuel cell and the hydrogen-oxygen fuel cell using hydrogen gas that are connected to each other.

On the other hand, as can be seen in FIG. 2, the production of hydrogen gas can be achieved by using the microbial fuel cell as power in the regenerative electrolysis tank without using solar power. Here again, the regenerated posolyte is returned to the cathode chamber of the microbial fuel cell. In this case, hydrogen production can be achieved continuously.

Investigation of the applicability of electron absorbers is important because they have significant effects on electricity production (J. G. Ibanez, C. S. Choi, R. S. Becker, Electrochemical Applications of Aqueous Redox Transition Metal Complexes as a Function of pH. *J Electrochem. Soc.* 134, 12(1987), 3084-3087). An electron absorber having high reduction potential and a low overvoltage in the graphite electrode and having a very fast electron transfer reaction—for example, one selected from the group consisting of $Fe(III)(4,4-dimethyl-2,2'-bipyridyl)_3$, $Fe(III)(2,2'-bipyridyl)_3$, $Fe(III)(2,2'-bipyridine-4,4'-disulfonate)_3$, $Fe(III)(2,2'-bipyridine-5-sulfonate)_3$, $Fe(III)(4,4'-bis(triethylammoniummethyl)-2,2'-bipyridine)_3$, $Fe(III)(triethylammonium-2,2'-bipyridine)_3$, $Fe(III)(2,2'-bipyridine-5,5'-dicarboxylic\ acid)_3$, $Fe(III)(1,10-phen)_3$, $Ru(III)(2,2'-bipyridine)_3$, $Ru(III)(4,4'-bis(triethylammoniummethyl)-2,2'-bipyridine)_3$, 4-trimethylammonium-2,2,6,6-tetramethylpiperidine-1-oxyl iodide, 2,2,6,6-tetramethylpiperidine-1-oxyl sulfonate, sodium salt, TEMPO-4-sulfate, potassium, 4-[3-(trimethylammonium)propoxy]-2,2,6,6-tetramethylpiperidine-1-oxyl chloride, (2,2,6,6-tetramethylpiperidine-1-yl)-oxyl copolymer, poly(TEMPO), 4-hydroxy-2,2,6,6-tetramethylpiperidine-1-oxyl, 4-amino-2,2,6,6-tetramethyl piperidine-1-oxyl, 2,2,6,6-tetramethylpiperidine-1-oxyl, 4-carboxy-2,2,6,6-tetramethyl piperidine-1-oxyl, 3-carbamido-2,2,5,5-tetramethyl-3-carbamido-3-pyroline-1-oxyl, phthalimide-N-oxyl, N,N,N-2,2,6,6-heptamethylpiperidine-oxy-4-ammonium dichloride, poly(TEMPO-CO-PEGMA), 4,5-dihydroxy-1,3-benzenedisulfonate, disodium salt, 3,6-dihydroxy-2,4-dimethylbenzenesulfonate, sodium salt, N-hydroxyimide derivatives, (ferrocenylmethyl) trimethylammonium chloride, bis[(trimethylammonium)propyl] ferrocene, bis(3-trimethylaminopropyl)-ferrocene dichloride, ferrocene amine chloride, ferrocene dinitrogen dibromide, $Br_2$, $I_3^-$, $Mn^{3+}$ and combinations thereof may be used. Furthermore, the improved electron transfer rate with these metal ions, metal complexes and organic materials can produce a high current to produce an MFC that exhibits high electrical energy production performance.

The present inventors have prepared a high-efficiency MFC battery for energy production using metal ions, their metal complexes and organics as electron absorbers of the cathode through research, and they were used to investigate the effect of different electron acceptors on the performance of MFC cells.

Furthermore, a combined battery of 3 MFC unit cells connected in series and in parallel was investigated to compare the performance of the MFC battery in terms of open circuit voltage, current density and power density.

In one embodiment, the anode may be selected from the group consisting of carbon brush, carbon felt, carbon plate, carbon plate coated with porous carbon and combinations thereof.

In addition, in one embodiment, the cathode may be selected from the group consisting of cathode made of a metal or noble metal material having a low hydrogen generation overvoltage such as carbon brush, carbon felt, carbon plate, carbon plate coated with porous carbon, carbon plate coated with carbon nanotubes, platinum plate, titanium plate, stainless steel plate, etc. and combinations thereof.

The present inventors used a carbon brush as an anode in order to investigate the effect on power production. As the power generation of MFC cells was compared to carbon soles, carbon felts were also investigated. Finally, the sustainability of power generation of MFC cells using real wastewater as a lipid was also investigated.

As shown in FIG. 3, a polarization test and a discharge test were performed to evaluate the performance of the MFC battery. Studies such as this experiment have not been reported before. In the present invention, since the voltage can be stably obtained in parallel connection and the current is expressed as the sum of each unit cell, the cells were connected in parallel and the paralleled bundles were connected again in series, the resulting high voltage could be achieved. In addition, in order to increase the area of the electrode in the battery chamber, the maximum amount of electrode material was put, and as a result, a high current was achieved. In particular, when a carbon brush is used to provide smooth supply of a solution as well as an electrode area, the current is significantly increased compared to that of carbon felt.

The reduced posolyte, which is a discharge material, can be regenerated by various external power sources such as solar cells and returned to the MFC. In this case, an electrolysis cell separated by a separation membrane between the two electrode chambers is used. Hydrogen gas is generated in the electrode chamber opposite to the regeneration electrode chamber, and electric energy can also be obtained by supplying it to the fuel cell.

The anode comprised in the anode chamber of the microbial fuel cell of the present invention is an anode having a microbial film formed on the surface, and as the microorganism, anaerobic microorganisms of an anaerobic digester of a wastewater treatment plant can be used.

The microbial membrane can be prepared by a method comprising putting a phosphate buffer mixed with organic matter as a carbon source and anaerobic sludge obtained from an anaerobic digester into an anode chamber comprising an anode, putting the same phosphate buffer as that of the anode chamber except for organic substances in the cathode chamber separated from the anode chamber using ion exchange membranes such as Membrane International, Celegard and Selemion DSV as a separation membrane and forming a microbial film on the anode of the anode chamber by supplying air to the cathode chamber in order to use oxygen as an electron absorber. A closed circuit is formed by connecting an external resistance of about 1000 ohms on the circuit between the anode and the cathode.

The anode chamber comprises an organic solution serving as an electron donor as a negolyte, and as can be seen from FIGS. 1 and 2, the organic solution can be continuously supplied to the anode chamber. Although not particularly limited, the organic solution may include one selected from the group consisting of acetate, glucose, protein, hydrolysate of food, domestic wastewater, anaerobic sludge, algae and combinations thereof.

In one embodiment, the anode chamber and the cathode chamber of the microbial fuel cell of the present invention are two separate regions in an integrated container made of an insulating material, and the separation membrane is in the form of a window frame, which is pressed and inserted between the anode chamber and the cathode chamber, and may be provided with one or more O-rings—for example, 1 to 3 O-rings. In the case of the separation membrane, leakage occurred more frequently when separated by compression using a bolt and nut than when separated with a single O-ring.

In order to extend the life of the battery, it is necessary to prevent leakage. For this purpose, a method comprising making the separation membrane (ion exchange membrane) that moves the electrolyte integrally by sandwiching between the frame plates of a material such as plastic, and using one or more O-rings in the frame is used.

The form of the separation membrane may be a cation exchange membrane, an anion exchange membrane, a cation-anion composite membrane or a microporous membrane capable of passing ions.

In the microbial fuel cell of the present invention, the anode and the cathode are carbon brushes, and the amount of the carbon brush comprised in the cathode chamber may be excessive than the amount of carbon brush comprised in the anode chamber.

The electrolysis cell comprised in the microbial fuel cell of the present invention may comprise a cathode and an anode to which power is applied, and a reduced posolyte transferred from the reduction electrode chamber. The reduced posolyte transferred from the cathode may be regenerated through electrolysis using external power, the regenerated posolyte may be supplied back to the cathode chamber, and hydrogen gas generated in the cathode chamber due to the electrolysis performed in the electrolysis cell may be discharged to the outside of the electrolysis cell.

The electrode of the electrolysis cell may comprise an anode having a high oxygen overvoltage, such as a lead dioxide electrode or an electrode which is metal plate such as titanium coated with lead dioxide; and a cathode made of a metal or noble metal material having a low hydrogen generation overvoltage such as carbon brush, carbon felt, carbon plate, carbon plate coated with porous carbon, carbon plate coated with carbon nanotubes, platinum plate, titanium plate, stainless steel plate—for example, a cathode selected from the group consisting of platinum plate, titanium plate, stainless steel plate and combinations thereof.

The microbial fuel cell of the present invention may further comprise a posolyte storage unit for accumulating the posolyte regenerated in the electrolysis cell, and supplying the accumulated posolyte to the cathode chamber; and a hydrogen gas storage unit for accumulating hydrogen gas generated in the electrolysis cell. The posolyte regenerated in the electrolysis cell may be directly supplied to the cathode chamber, or alternatively, after being accumulated in the posolyte storage unit, may be supplied to the cathode chamber when necessary. In addition, the hydrogen gas generated in the electrolysis cell may be directly discharged to the outside, or alternatively after being accumulated in the hydrogen gas storage unit, may be supplied to the hydrogen-oxygen fuel cell to additionally produce electrical energy.

Another aspect of the present invention includes a method for producing electrical energy using the above microbial fuel cell.

Although not particularly limited, it is possible to produce electrical energy by connecting a plurality of microbial fuel cells being connected in parallel or in series. In one embodiment, a high voltage can be achieved by connecting the microbial fuel cells in parallel once and connecting the parallel-connected bundles in series again.

In addition, the method for producing electrical energy of the present invention can additionally produce electric energy by supplying hydrogen gas generated in the electrolysis cell to the hydrogen-oxygen fuel cell.

The present invention is explained in more detail through the following Examples and Comparative Examples. However, the scope of the present invention is not limited thereby in any manner.

EXAMPLES

Preparation of MFC for Polarization Test and Discharge Test (FIG. 3)

To investigate the effect of the electron absorber on MFC performance, a two-chamber microbial fuel cell design with an anode chamber with a working volume of 500 mL and a cathode chamber with a volume of 600 mL was used.

To test the electrode, a carbon brush (D 4 cm×L 7 cm) or carbon felt (W 4 cm×H 7 cm) was used as an anode material. The used carbon brush had a diameter of 4 cm and a length of 7 cm and provided an area of 28 $cm^2$. In addition, a graphite plate (2.5 cm×6 cm) or a carbon brush was used as a cathode.

Except during the polarization test, an external circuit resistance of 1000 was connected between the anode and cathode. The anode and cathode were separated by a pre-treated ion exchange membrane (AEM, AMI-7001 or CEM, CEM-7001, Membrane International, Inc. USA).

The anaerobic inoculum was collected from anaerobic sludge previously published by Choi and Cui (Recovery of silver from wastewater coupled with power generation using a microbial fuel cell. J. Bioresour Technol 107(2012), 522-525). The three chambers of the cell were inoculated by filling the chambers with a mixture of 400 mL sludge and 100 mL of artificial wastewater (pH 7) as negolyte. The composition per liter of artificial wastewater is as follows: 2.0 g of $CH_3COONa$, 1.05 g of $NH_4Cl$, 1.5 g of $KH_2PO_4$, 2.2 g of $K_2HPO_4$ and 0.2 g of yeast extract. The negolyte was continuously circulated, and the buffer solution was poured into the cathode chamber. At the same time, air was supplied to the cathode chamber in order to use dissolved oxygen as an electron absorber when growing microorganisms. The anode chamber was covered with a thin film of aluminum to prevent exposure of oxidizing bacteria to light.

Before operation, nitrogen gas was blown into the negolyte solution for about 15 minutes to create an anaerobic environment. This method was repeated, and the electrolyte medium was exchanged when the voltage dropped below 50 mV. After obtaining a stable voltage production with the wastewater, the negolyte was exchanged with the growth medium. Initial runs were performed after obtaining stable MFC performance indicating adequate biofilm formation.

In the preparation of the posolyte, $K_2Cr_2O_7$, $FeCl_3 \cdot 6H_2O$, $NaHSO_4$ and $Na_2SO_4$ were purchased from Daejeong Chemical, Korea, and 4,4'-dimethyl-2,2'-bipyridine (4,4'-dimethyl-2,2'-BIPY), 2,2'-bipyridine (2,2'-BIPY) and 1,10-phenanthroline (1,10-PHEN) were purchased from Aldrich Chemical Company, USA. A posolyte solution (pH 2) of 5000 ppm Cr(VI) and 5000 ppm Fe(III) containing a supporting electrolyte (0.1 M $Na_2SO_4$) was prepared using a suitable reagent. $Fe(III)(BIPY)_3$ was prepared as follows (J. G. Ibanez, C.-S. Choi, R. S. Becker, Electrochemical Applications of Aqueous Redox Transition Metal Complexes as a Function of pH. *J Electrochem. Soc.* 134, 12(1987), 3084-3087). The ratio of metal to ligand was 1:4. The complex and supporting electrolyte were 5000 ppm and 0.1 M based on Fe(III), respectively. 3 M NaOH was used to adjust pH 2. $Fe(III)(1,10-PHEN)_3$ was prepared using the same conditions. Preparations of metal complexes were commonly done at room temperature.

Polarization and Discharge Tests

Polarization test—The polarization test was performed to evaluate the MFC cell performance by obtaining the maximum power density and the internal resistance. Cell potential data were measured every minute with LabView System (National Instruments Models, NI-cDAQ 9219, USA). Various external resistances from 150 kΩ to 0.010 kΩ were applied to obtain a polarization curve for the determination of the maximum power production. The current density was calculated by the following equation:

$$I_d = V/RA, \qquad (1)$$

wherein V(V) is the voltage between the resistors, R(Ω) is the external resistance and A(cm²) is the surface area of the cathode. The power density ($P_d$) was calculated by the following equation:

$$P_d = V^2/RA \quad (2)$$

Discharge test—In order to evaluate the discharge property of the MFC battery, a voltage change at a constant current was used. Each cathode chamber contained 180 mL of posolyte, and the anode chamber also contained the same volume of negolyte solution. After the first discharge of the MFC cell, the solution in the anode chamber was replaced with a new solution. The discharge test was performed under constant current conditions using a constant voltage device IVIUM made in the Netherlands, which can conduct discharge experiments at constant current using a two-electrode system. The discharge current was chosen to ensure that a significant cell voltage and power production were obtained. The discharge current was selected based on the power curve. For the power density curves of MFC cells with different posolytes having different maximum power points, different discharge currents were used to evaluate whether efficient discharge would be achieved. The current on the maximum power point is the ideal operating point due to the high energy output. The discharge tests were run comparatively at various current levels.

Effect of Electron Absorber Concentration on the Performance of Variously Connected 3-Unit MFC Cells The effect of Cr(VI) initial reducing electrolyte concentration was studied. The connection of 3 MFC unit cells in series or parallel connection increases the voltage and current, respectively. The effect on microbial electricity production was tested. Polarization and power curves were presented, and electrochemical parameters were reported and discussed. Discharge performance was also presented and discussed.

Figure 4:
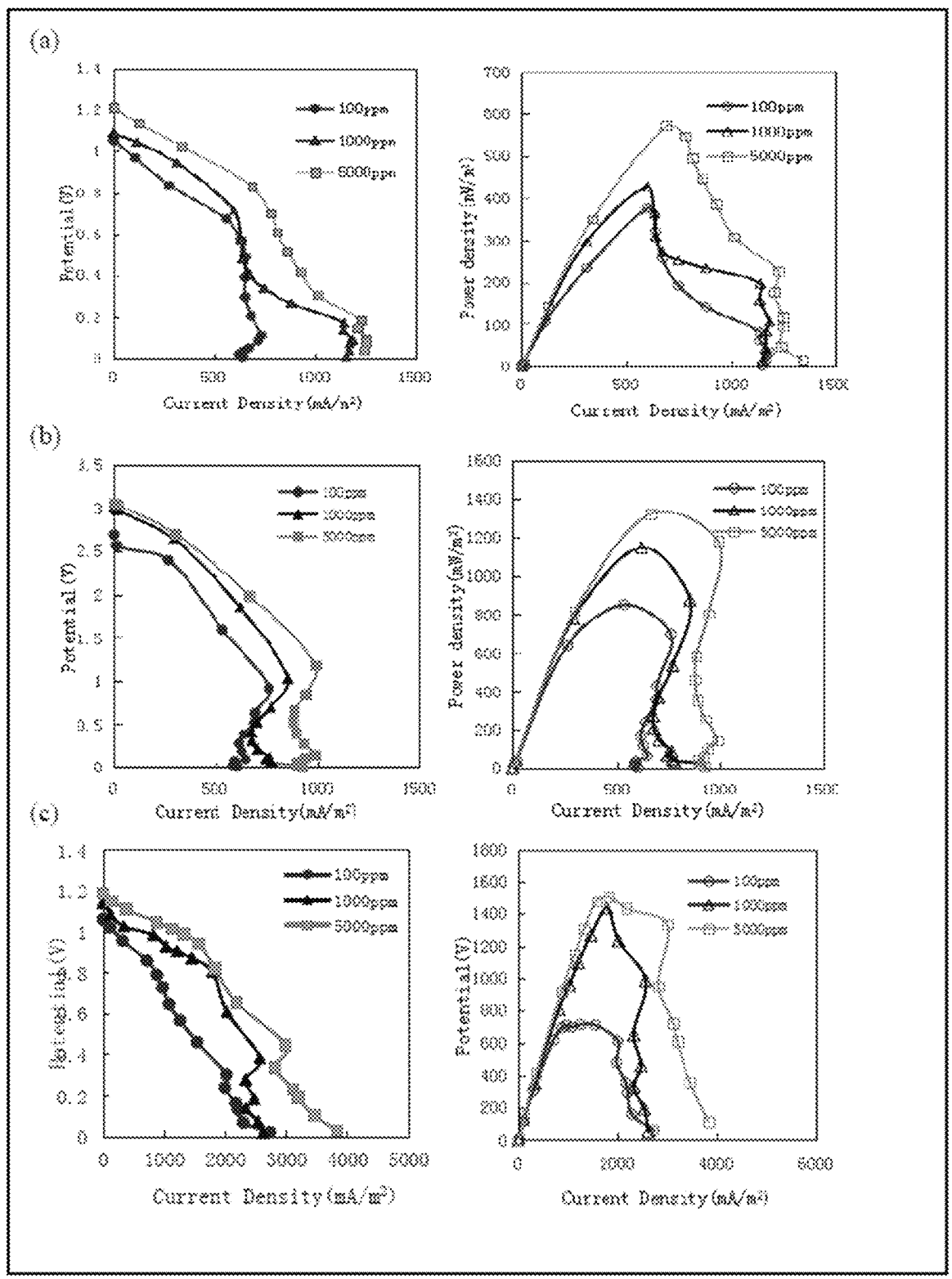
FIG. 4 is a graph showing potential vs. current density curve and power density vs. current density curve of (a) a single cell, (b) series-connected MFCs and (c) parallel-connected MFCs with Cr(VI) cathode with different Cr(VI) concentrations of 100, 1000 and 5000 ppm.

FIG. 4 is a graph showing potential vs. current density curve and power density vs. current density curve of (a) a single cell, (b) series-connected MFCs and (c) parallel-connected MFCs with Cr(VI) cathode with different Cr(VI) concentrations of 100, 1000 and 5000 ppm.

The following is an embodiment showing an example of power generation of the MFC for high power generation, but the scope of the present invention is not limited thereto.

(1) Polarization Behavior of MFC with Cr(VI) as Electron Absorber

In order to determine the maximum achievable power density using various concentrations of Cr(VI), a polarization curve test was performed by changing the external resistance from 150 kΩ to 10Ω to obtain a stable voltage and then measuring the voltage. FIG. 4 presents a potential versus current density curve and a power density versus current density curve with a change in the initial concentration of Cr(VI).

TABLE 1

|  | $C_{Cr(VI)}$/ppm | $V_{ocv}$/V | $J_{max}$/(mAm⁻²) | $J_{peak}$/(mAm⁻²) | $P_{max}$/(mWm⁻²) |
|---|---|---|---|---|---|
| Single | 100 | 1.051 | 735.33 | 561 | 377.67 |
|  | 1000 | 1.089 | 1155.13 | 597.17 | 427.93 |
|  | 5000 | 1.213 | 1346.15 | 690.33 | 571.87 |
| Series | 100 | 2.697 | 761.83 | 532.33 | 850.14 |
|  | 1000 | 3.012 | 910 | 618.37 | 1147.12 |
|  | 5000 | 3.059 | 992 | 664.13 | 1323.22 |

TABLE 1-continued

|  | $C_{Cr(VI)}$/ppm | $V_{ocv}$/V | $J_{max}$/(mAm⁻²) | $J_{peak}$/(mAm⁻²) | $P_{max}$/(mWm⁻²) |
|---|---|---|---|---|---|
| Parallel | 100 | 1.064 | 2730.77 | 1260.22 | 714.67 |
|  | 1000 | 1.146 | 2615.38 | 2028.33 | 1234.24 |
|  | 5000 | 1.188 | 3833.33 | 2185 | 1432.27 |

* $C_{Cr(VI)}$: Concentration of Cr(VI), $V_{ocv}$: open circuit voltage, $J_{max}$: maximum current density, $J_{peak}$: peak current density, $P_{max}$: maximum power density Electrochemical parameters are summarized in Table 1. The maximum power output of the unit MFC increased when the Cr(VI) concentration was increased from 100 ppm to 5000 ppm. Power production increased from $P_{max}$ 377.7 mWm⁻² (for 100 ppm Cr(VI) concentration) to $P_{max}$ 571.9 mWm⁻² (for 5000 ppm Cr(VI) concentration). The series-connected MFC cells were able to increase the voltage as expected. During series connection, the open circuit voltage was 2.697 V and $P_{max}$ was 850.1 mWm⁻² for 100 ppm Cr(VI) concentration, whereas the open circuit voltage was 3.059 V and $P_{max}$ was 1323.2. mWm⁻² for 5000 ppm Cr(VI) concentration. The maximum power was 1.55 times higher at 5000 ppm concentration than at 100 ppm.

During parallel connection, the maximum current density was 2730.8 mAm⁻² at $P_{max}$ 714.7 mWm⁻² for 100 ppm Cr(VI) concentration, whereas the maximum current density was increased to 3833.3 mAm⁻² at $P_{max}$ 1432.3 mWm⁻² for 5000 ppm Cr(VI) concentration. The power density showed a double improvement in the 5000 ppm concentration compared to the 100 ppm concentration.

This study showed that a high concentration of Cr(VI) as an electron absorber has a good ability for MFC performance. However, as will be described later, power production was lower than when Fe(III)(4,4'-dimethyl-2,2'-bipyridyl)₃ was used as the electron acceptor.

(2) Discharge Performance of Cr(VI)-MFC Composed of 5000 ppm Three Unit Cells

FIG. 5 is a graph showing (A) discharging curves of the battery comprising 3 unit MFCs with series connection and (B) discharging curves of the battery comprising 3 unit MFCs with parallel connection (wherein, cathode is graphite plate (2.5 cm×6 cm), posolyte is 170 mL of 5000 ppm Cr(VI), anode is carbon brush (D 4 cm, H 7 cm), and negolyte is 2 g/L acetate and 0.2 g/L yeast extract dissolved in PBS).

In FIG. 5, the results of the discharging behavior of the series-connected battery and the parallel-connected battery with 5000 ppm Cr(VI) at various constant currents are compared. It can be seen that the discharge characteristics of the MFC are highly dependent on the selected current. In the discharge voltage of the series connection, as the discharge current increased from 0.5 mA to 1.5 mA, the voltage maintained an almost flat part at the beginning, and then dropped sharply at the end (FIG. 5A). In parallel connection, when changing from 1.5 mA to 4.5 mA, the discharge voltage also showed a flat part at first, and then showed a shape that dropped sharply at the end.

Although not presented as a graph, in another study conducted in this laboratory, the voltage decreased more rapidly at 1000 ppm than at 5000 ppm of Cr(VI) concentration for the same discharge current. This means that MFC with 5000 ppm Cr(VI) concentration showed better discharge performance compared to 1000 ppm.

Until the electron absorber was consumed in 170 mL of the reducing electrolyte, it lasted about 70 hours at 0.5 mA in series connection and 68 hours, and a similar duration at 1.5 mA in parallel connection. This means that the current density of the series connection is similar to the current density of the parallel connection, and it can be said that the reduction reaction rate of the cathode in the electrode reaction of both connections is almost the same.

The high discharge voltage of the high Cr(VI) concentration can be attributed to the increase of the reaction rate at the cathode and the decrease in the internal resistance of the cathode. The reason that the voltage in the series connection drops much more than the expected 3 V level is thought to be caused by the resistance of the wire connection and the deepening of the battery leakage. By widening the surface of the electrode placed in the electrode chamber, the magnitude of the current can be improved.

(3) Polarization Property of MFC with Various Electron Absorbers

Figure 6:
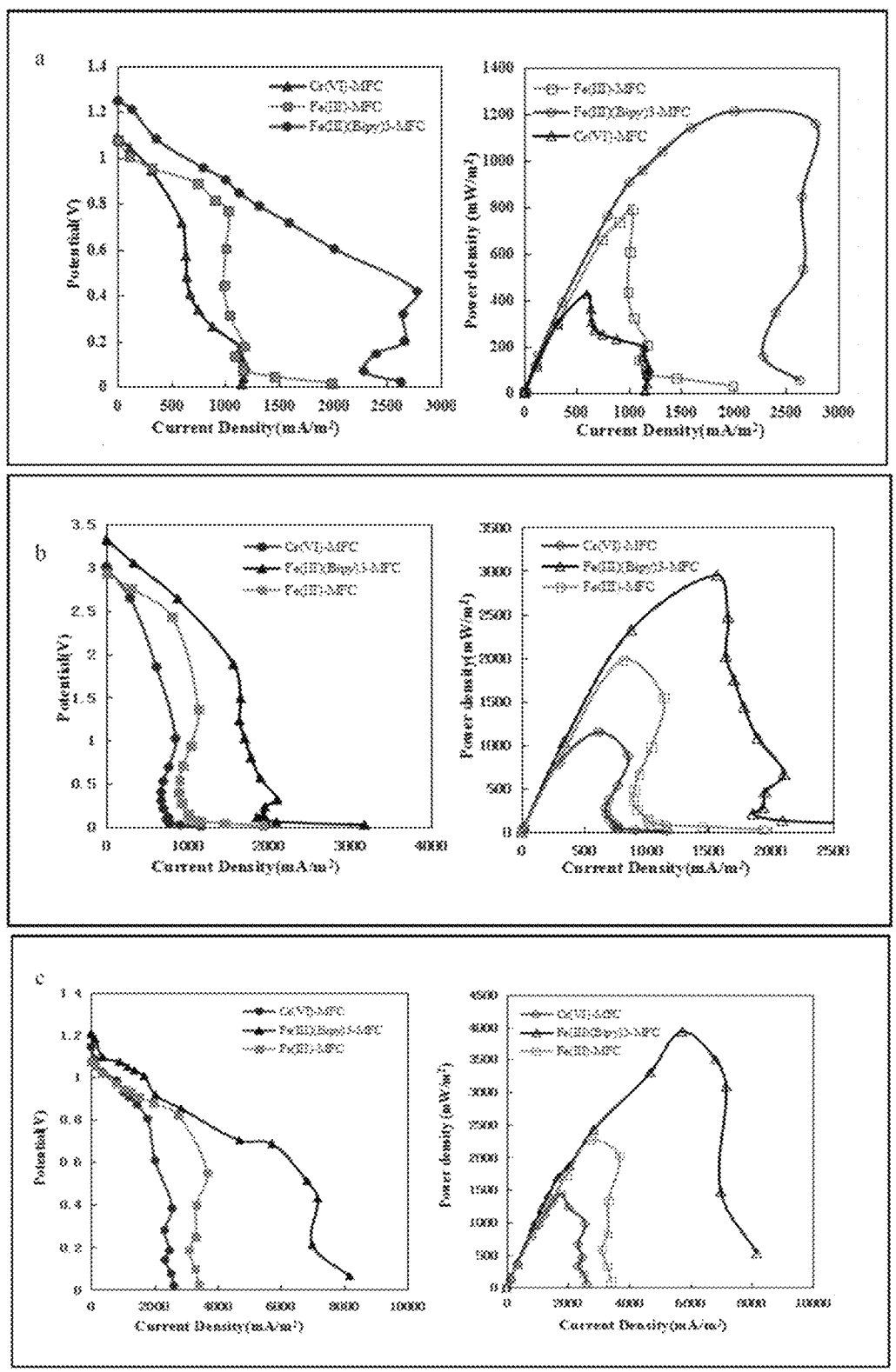
FIG. 6 is a graph showing polarization curve and power density-current density curve of (a) a single cell, (b) series-connected 3 unit MFCs and (c) parallel-connected 3 unit MFCs with different electron acceptors in the cathode chamber.

To determine the maximum achievable power density with various reduction electron acceptors, a polarization test was performed by measuring the voltage after obtaining a stable voltage output while changing the external resistance from 150 kΩ to 0.010 kΩ. MFC showed excellent performance by using Fe(III)(4,4'-dimethyl-2,2'-bipyridyl)$_3$ as an electron absorber. FIG. 6 shows voltage vs. current density and power vs. current density curves using various electron absorbers.

FIG. 6 is a graph showing polarization curve and power density-current density curve of (a) a single cell, (b) series-connected 3 unit MFCs and (c) parallel-connected 3 unit MFCs with different electron acceptors in the cathode chamber.

TABLE 2

| Type of connection | Type of electron acceptor | $V_{ocv}$/ V | $J_{max}$/ (mAm$^{-2}$) | $J_{peak}$/ (mAm$^{-2}$) | $P_{max}$/ (mWm$^{-2}$) |
|---|---|---|---|---|---|
| Single | Cr(VI) | 1.089 | 1155.13 | 597.17 | 427.93 |
|  | Fe(III) | 1.079 | 1987.18 | 1027.73 | 792.18 |
|  | Fe(III)(4,4'-dimethyl-2-2'-bipyridyl)$_3$ | 1.250 | 2628.21 | 2010.00 | 1212.03 |
| Series | Cr(VI) | 3.012 | 1166.67 | 618.37 | 1147.13 |
|  | Fe(III) | 2.937 | 1935.90 | 811.17 | 1973.94 |
|  | Fe(III)(4,4'-dimethyl-2-2'-bipyridyl)$_3$ | 3.323 | 3179.49 | 1568.25 | 2951.29 |
| Parallel | Cr(VI) | 1.146 | 2615.38 | 2028.33 | 1234.24 |
|  | Fe(III) | 1.076 | 3410.26 | 2743.67 | 2258.31 |
|  | Fe(III)(4,4'-dimethyl-2-2'-bipyridyl)$_3$ | 1.210 | 8179.49 | 5727.50 | 3936.51 |

* $C_{Cr(VI)}$; Concentration of Cr(VI), $V_{ocv}$; open circuit voltage, $J_{max}$; maximum current density, $J_{peak}$; peak current density, $P_{max}$; maximum power density In a single MFC cell, when Fe(III)(4,4'-dimethyl-2,2'-bipyridyl)$_3$ was used as the electron absorber, the maximum electrochemical factors were exhibited, which had a voltage (OCV) of 1.250 V and a maximum current density ($J_{max}$) of 2628 mA·m$^{-2}$ and a maximum power density of 1212 mW·m$^{-2}$, respectively. The maximum current density was 2.3 times higher than that of Cr(VI), and the maximum power density was 2.8 times higher (see Table 2).

It can be seen that the action of the electron absorber is very important for the production of electrical energy. In the series connection, when Fe(III)(4,4'-dimethyl-2,2'-bipyridyl)$_3$ was used as the electron absorber, the maximum electrochemical factors were also exhibited, which had a voltage (OCV) of 3.323 V and maximum current density ($J_{max}$) of 3179 mA·m$^{-2}$ and maximum power density of 2951 mW·m$^{-2}$, respectively. The maximum current density was 2.7 times higher than that of Cr(VI), and the maximum power density was 2.6 times higher (see Table 2).

In parallel connection, when Fe(III)(4,4'-dimethyl-2,2'-bipyridyl)$_3$ was used as the electron absorber, the maximum electrochemical factors were also exhibited, which had a voltage (OCV) of 1.210 V and a maximum current density ($J_{max}$) of 8179 mA·m$^{-2}$ and a maximum power density of 3937 mW·m$^{-2}$, respectively. The maximum current density was 3.13 times higher than that of Cr(VI), and the maximum power density was 3.19 times higher than that of Cr(VI) (See Table 2).

Compared to the parallel connection of single cells, the OCV when three unit cells were connected in series was 2.7 times higher, and the current in parallel connection was 3.1 times higher than that of single-cell or series connection. On the other hand, the power density in parallel connection was only 1.3 times higher than in series connection, but 3.2 times higher than that of single-cell connection. This indicates that when single cells are connected in series or parallel, power increases in proportion to the number of cells, just like a general battery.

(4) Discharge Performance of MFC Batteries with Various Electron Absorbers

Figure 7:
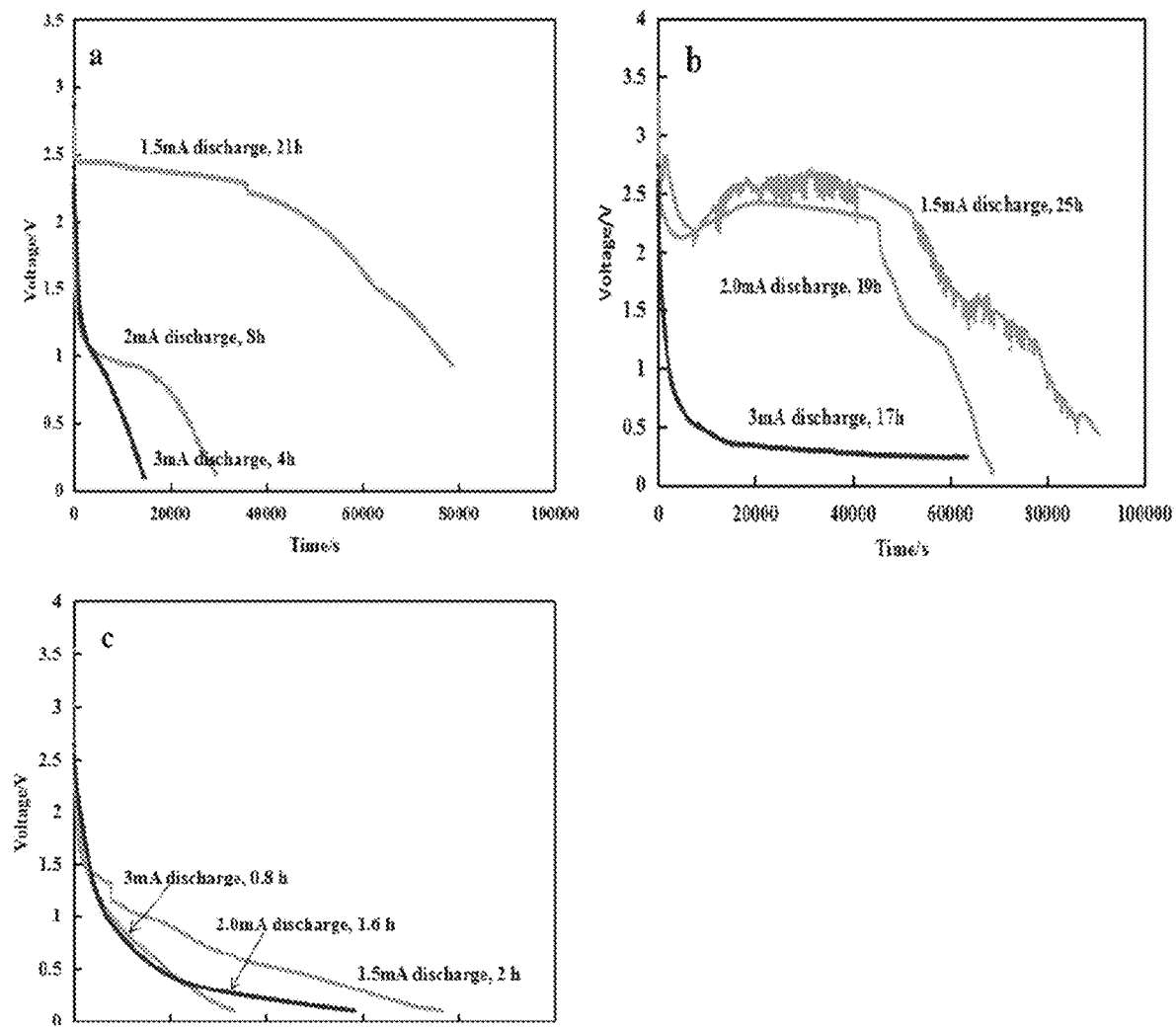
FIG. 7 is a graph showing discharging curves of the series-connected 3 unit MFC batteries with (a) Fe(III), (b) Fe(III)(4,4'-dimethyl-2,2'-bipyridyl)$_3$ and (c) Fe(III)(1,10-phen)$_3$ as electron acceptors at different discharging currents (wherein, anode is carbon brush (D 4 cm, H 7 cm) and negolyte is 2 g/L acetate and 0.2 g/L yeast extract dissolved in PBS).

FIG. 7 is a graph showing discharging curves of the series-connected 3 unit MFC batteries with (a) Fe(III), (b) Fe(III)(4,4'-dimethyl-2,2'-bipyridyl)$_3$ and (c) Fe(III)(1,10-phen)$_3$ as electron acceptors at different discharging currents (wherein, anode is carbon brush (D 4 cm, H 7 cm) and negolyte is 2 g/L acetate and 0.2 g/L yeast extract dissolved in PBS).

Figure 8:
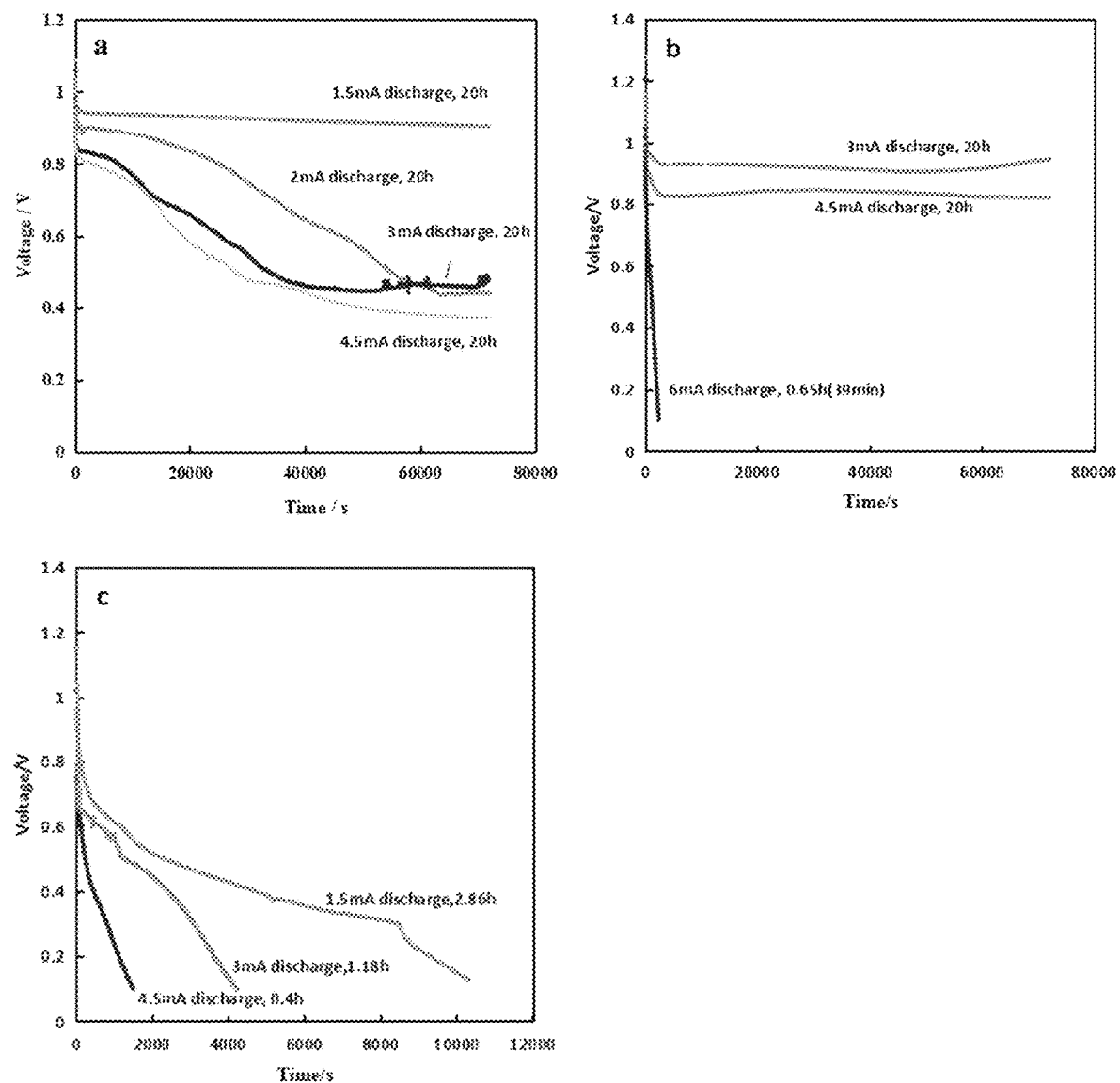
FIG. 8 is a graph showing discharge curves of the parallel-connected 3 unit MFC batteries with (a) Fe(III), (b) Fe(III)(4,4'-dimethyl-2,2'-bipyridyl)$_3$ and (c) Fe(III)(1,10-phen)$_3$ as electron acceptors at different discharge currents (wherein, anode is carbon brush (D 4 cm, H 7 cm) and as negolyte, 2 g/L acetate and 0.2 g/L yeast extract dissolved in PBS were used).

FIG. 8 is a graph showing discharge curves of the parallel-connected 3 unit MFC batteries with (a) Fe(III), (b) Fe(III)(4,4'-dimethyl-2,2'-bipyridyl)$_3$ and (c) Fe(III)(1,10-phen)$_3$ as electron acceptors at different discharge currents (wherein, anode is carbon brush (D 4 cm, H 7 cm) and as negolyte, 2 g/L acetate and 0.2 g/L yeast extract dissolved in PBS were used).

The discharge property of the MFC connected with 3 unit cells at a constant current was used to evaluate the battery performance. FIG. 7 shows the results of the discharge behavior of MFCs connected in series with MFC unit cells with Fe(III), Fe(III)(4,4'-dimethyl-2,2'-bipyridyl)$_3$ and Fe(III)(1,10-phen)$_3$ at 5000 ppm concentrations as electron absorbers at various constant currents.

In the Fe(III)-MFC system with an open circuit voltage of about 2.9 V, the discharge voltage gradually decreased from 2.5 V to 1.0 V at a discharge current of 1.5 mA, and discharge was performed for 25 hours. As shown in FIG. 7, the voltage clearly decreased as the discharge current of 1.5 mA or more increased. At a current of 1.5 mA or less, it showed stable discharge property. In Fe(III)(4,4'-dimethyl-2,2'-bipyridyl)$_3$-MFC, at a discharge current of 1.5 mA, the discharge voltage gradually decreased from 2.5 V to 1 V, and the discharge time lasted 25 hours. The open circuit voltage at this time was about 3.4 V. The pattern at the discharge current of 2 mA was similar to that of the discharge current of 1.5 mA, but the discharge time was about 19 hours.

At a discharge current of 2 mA or more, the discharge voltage decreased rapidly and continuously. Therefore, stable discharge property was shown at a current of 2 mA or less. In the case of using Fe(III)(1,10-phen)$_3$ as electron absorber, it can be inferred that there is a leak in the battery by seeing that the discharge voltage continuously decreased at all discharge currents.

As shown in FIG. 8, in the parallel connection using Fe(III) as an electron absorber in the cathode chamber, the batteries were stably discharged at a discharge current of 1.5 mA or less, but the batteries using Fe(III)(4,4'-dimethyl-2, 2'-bipyridyl)$_3$ as posolyte were stably discharged even at a discharge current of 3 mA or 4.5 mA. In parallel connection, the batteries showed stable discharge property at 4.5 mA or less. In the Fe(III)-MFC system, the batteries were stably discharged at the average discharge voltage of 0.925 V and discharge current of 1.5 mA for 21 hours, and the open circuit voltage at this time was 1.056 V.

As shown in FIG. 8, the voltage clearly decreased as the discharge current of 1.5 mA or more increased. Fe(III)(4, 4'-dimethyl-2,2'-bipyridyl)$_3$-MFC was found to have an average discharge voltage of 0.927 V at a discharge current of 3.0 mA, an open circuit voltage of 1.209 V, and lasted more than 20 hours. On the other hand, at a discharge current of 4.5 mA, the batteries had the open circuit voltage of 1.279 V and the average discharge voltage of 0.83004 V, and lasted more than 20 hours. As shown in FIG. 8*b*, the voltage clearly decreased with the increase of the discharge current to 6 mA. Fe(III)(1,10-phen)$_3$-MFC showed unstable discharge property at all discharge currents. This is probably the result of a battery leak.

(5) Effect of Material of Anode on Polarization Performance

In the MFC cell, the anode material showed an important effect on the current density and the maximum power density of the MFC.

Figure 9:
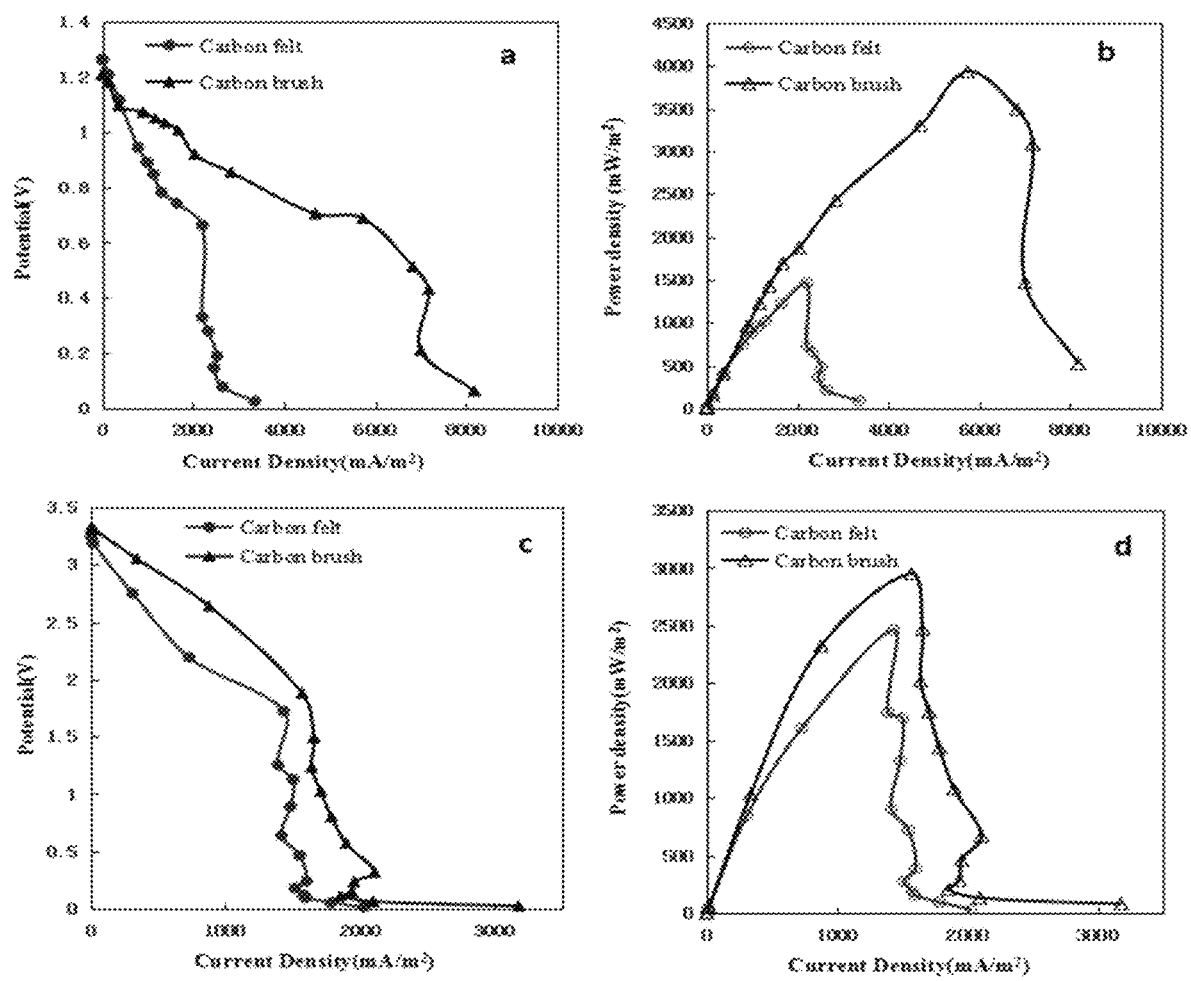
FIG. 9 is a graph showing the voltage vs. current density curve and the power density vs. current density curve of MFCs of parallel connection of (a) and (b), and series connection of (c) and (d) with different anode materials (carbon brush and carbon felt) (wherein, the posolyte is an electron absorber of 5000 ppm Fe(III)(4,4'-dimethyl-2,2'-bipyridyl)$_3$, a negolyte is 2 g/L acetate and 0.2 g/L yeast extract dissolved in PBS).

FIG. 9 is a graph showing the voltage vs. current density curve and the power density vs. current density curve of MFCs of parallel connection of (a) and (b), and series connection of (c) and (d) with different anode materials (carbon brush and carbon felt) (wherein, the posolyte is an electron absorber of 5000 ppm Fe(III)(4,4'-dimethyl-2,2'-bipyridyl)$_3$, a negolyte is 2 g/L acetate and 0.2 g/L yeast extract dissolved in PBS).

FIG. 9 shows polarization curves of a parallel-connected 3-unit cell batteries using 5000 ppm Fe(III)(4,4'-dimethyl-2,2'-bipyridyl)$_3$ as an electron absorber in the cathode and using carbon brush and carbon felt as anode (FIG. 9*a*) and that of the same MFC cell batteries in series connection (FIG. 9*b*). In the case of series connection, the MFC of the carbon brush electrode was slightly better in performance, and the maximum power of the power curve in the carbon brush electrode was 1.2 times higher than that of the carbon felt electrode (see Table 3). The maximum current density of the carbon brush electrode was about 1.6 times better than that of the carbon felt electrode.

In parallel connection, the carbon brush electrode showed the MFC's excellent polarization properties (FIG. 9*a*). The maximum power was 2.7 times higher when the carbon brush was used (see Table 3). Although the open circuit voltages were similar for the two electrodes, the maximum current was about 2.6 times superior to that of the carbon felt electrode in the carbon brush electrode, showing that adopting the carbon brush electrode for the anode would be advantageous in terms of battery efficiency (see Table 3).

The difference in performance as described above can be explained by the fact that fewer microorganisms are attached to the carbon felt anode compared to the carbon brush anode, and thus the microorganisms are not smoothly supplied to the negolyte.

TABLE 3

| Type of connection | Type of electrode | $V_{ocv}$/ V | $J_{max}$/ (mAm$^{-2}$) | $J_{peak}$/ (mAm$^{-2}$) | $P_{max}$/ (mWm$^{-2}$) |
|---|---|---|---|---|---|
| Series | Carbon felt | 3.24 | 2026.41 | 1432.25 | 2461.61 |
| | Carbon brush | 3.32 | 3179.48 | 1568.25 | 2951.28 |

TABLE 3-continued

| Type of connection | Type of electrode | $V_{ocv}$/ V | $J_{max}$/ (mAm$^{-2}$) | $J_{peak}$/ (mAm$^{-2}$) | $P_{max}$/ (mWm$^{-2}$) |
|---|---|---|---|---|---|
| Parallel | Carbon felt | 1.26 | 3358.97 | 2207.67 | 1462.14 |
| | Carbon brush | 1.21 | 8179.49 | 5727.5 | 3936.51 |

*$V_{ocv}$; open circuit voltage, $J_{max}$; maximum current density, $J_{peak}$; peak current density, $P_{max}$; maximum power density. The posolyte contains 5000 ppm Fe(III)(4,4'-dimethyl-2,2'-bipyridyl)$_3$ as an electron absorber, and the negolyte is a solution obtained by dissolving 2 g/L acetate and 0.2 g/L yeast extract in PBS.

(6) Discharge Performance of MFCs with Different Anode Materials

Figure 10:
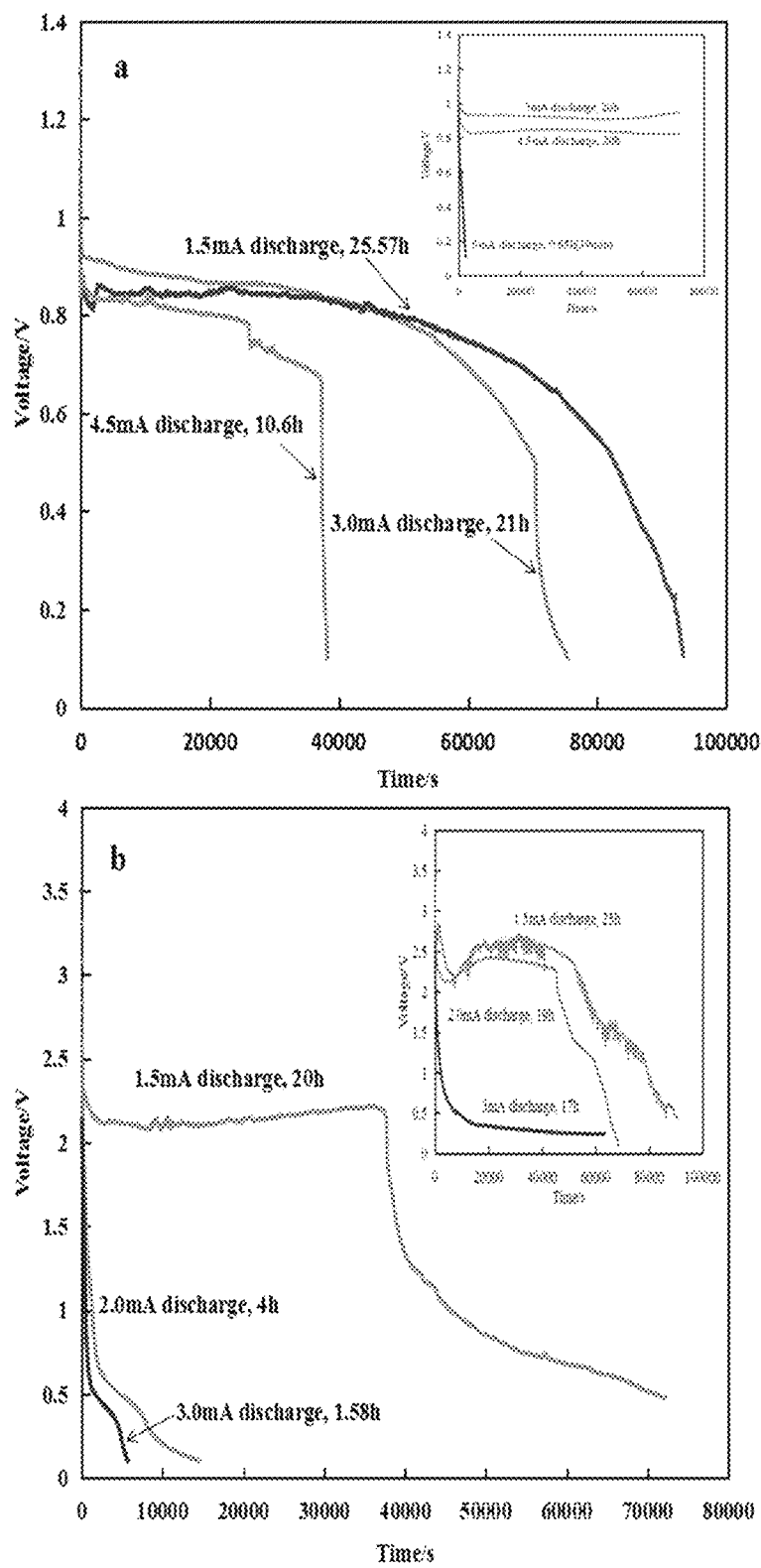
FIG. 10 is a graph showing discharge performance of MFC batteries using carbon felt as anode connecting in parallel (a) and in series (b) at different discharge current and as an inset, discharge performance of MFC batteries using carbon brush anode (wherein, posolyte is a solution of 5000 ppm Fe(III)(4,4'-dimethyl-2,2'-bipyridyl)$_3$ as an electron acceptor, negolyte is 2 g/L acetate and 0.2 g/L yeast extract in PBS).

FIG. 10 shows the discharge performance of 3-unit cell MFCs which are connected in parallel and in series using Fe(III)(4,4'-dimethyl-2,2'-bipyridyl)$_3$ as 5000 ppm electron absorber of Fe(III) at various discharge currents. Carbon felt was used for the anode chamber, and it was compared with the carbon brush electrode studied previously (inset).

In the parallel connection of the batteries with carbon felt as the anode, the discharge voltage decreased slowly with the increase of the discharge time. The battery had an open circuit voltage of 1.29 V at a discharge current of 3.0 mA, an average discharge voltage of 0.79 V, and a discharge time of 25.6 hours.

On the other hand, in the parallel connection of the batteries using the carbon brush electrode as the anode, the batteries had the average discharge voltage of 0.93 V at 3.0 mA discharge current, which was 15% higher than the case using carbon felt (0.79 V), and the discharge time lasted more than 20 hours. The open circuit voltage at this time was 1.21 V. When the discharge current was 4.5 mA, the battery with the carbon felt anode lasted 10.6 hours, while the battery with the carbon brush electrode lasted more than 20 hours (see FIG. 10).

In the series connection of MFCs using carbon felt as anodes, the discharge voltage decreased when the discharge current increased from 1.5 mA to more than 2.0 mA. The battery was found to show stable discharge property at a discharge current of 1.5 mA or less. For a discharge current of 2.0 mA, the discharge voltage decreased faster when the carbon felt was used as the anode than when the carbon brush electrode was used. When carbon felt was used, the average discharge voltage was 0.51 V and the open circuit voltage was 3.50 V, which lasted 1.58 hours.

When the carbon brush electrode was used as the anode, the open circuit voltage was 2.78 V and the average discharge voltage was 0.42 V, which lasted for 17 hours. These results show that in the MFC cells connected to the unit cell, when the carbon brush electrode is used as an anode, a microbial film forms well and the batteries exhibit very good performance. The reason is that the carbon brush electrode guarantees a higher specific surface area and porosity, and it is thought that more anaerobic microorganisms grow on the carbon brush than on the carbon felt. A higher number of bacteria means a faster response.

(7) Regeneration Test of Cr(VI) Using Solar Cell as External Power

Figure 11:
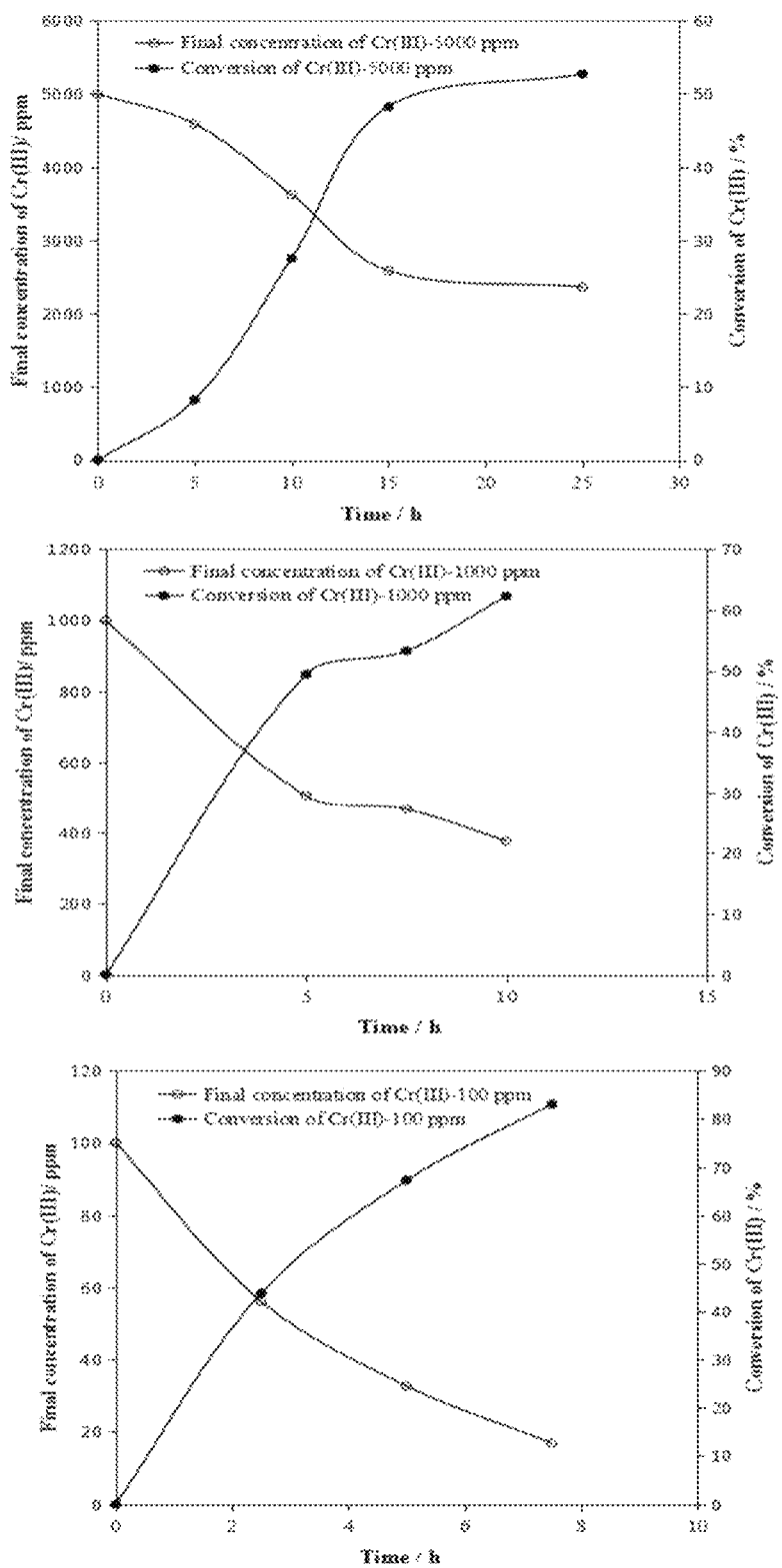
FIG. 11 is a graph showing the remaining Cr(III) concentration and the conversion efficiency of Cr(III) to Cr(VI) with time in converting Cr(III) to Cr(VI) in the anode chamber by applying power with a constant current of 0.2 mA (wherein, the regeneration rate of Cr(VI): a solution of 5000 ppm Cr(III) and 0.1 M Na$_2$SO$_4$, NaHSO$_4$ (180 mL) (pH 2). The posolyte is 180 mL of 0.1 M Na$_2$SO$_4$, NaHSO$_4$).

FIG. 11 shows the remaining Cr(III) concentration and the conversion efficiency of Cr(III) to Cr(VI) with time when Cr(III) is converted to Cr(VI) by applying power with a constant current of 0.2 mA. For the electrode, Ti metal plate with an electrode area of 20 cm$^2$ coated with PbO$_2$ was used as an anode, and a stainless steel plate of the same width was used for the counter electrode. At this time, the initial concentration of the solution was 5000 ppm, and the solution volume was 180 mL.

After 25 hours of reaction, the conversion efficiency was finally 53%. The generation of hydrogen gas can be calculated by Faraday's law, and hydrogen gas was obtained at a ratio of $1.09 \times 10^{-7}$ mol/g Cr(VI). This can be used as fuel for fuel cells and for electricity production. At an initial concentration of 1000 ppm and an initial concentration of 100 ppm of Cr(III), 62% of Cr(III) converted to Cr(VI) in 10 hours and 83% of Cr(III) converted to Cr(VI) in 7.5 hours, respectively.

In general, it is presumed that the reason that the conversion takes longer than Fe(III) or its complex is that three electrons are involved in the oxidation of Cr(III) and one electron is required in the oxidation of Fe(II).

(8) Regeneration Test of Fe(III) Using Solar Cell as External Power

Since it is not easy to measure Fe(III) in the presence of Fe(II), the regeneration rate of Fe(III) can be expressed as the ratio of Fe(III)/Fe(II) using the following Nernst equation:

$$E_{rev} = E^{0'} - RT/F \ln[Fe(II)]/[Fe(III)] \quad (3)$$

$$[Fe(II)]/[Fe(III)] = e^{(E^{0'}-E_{rev})RT} \quad (4)$$

The ratio of [Fe(II)]/[Fe(III)] in the negolyte can be determined by measuring the voltage of the negolyte relative to a reference electrode such as Ag/AgCl. Hereinafter, the degree of regeneration can be determined in the same way for other Fe(III) complexes.

FIG. 12a shows the ratio of Fe(II)/Fe(III) with respect to time to convert Fe(II) to Fe(III) by applying power with a constant current of 0.05 mA. For the electrode, Ti metal plate with an electrode area of 20 cm$^2$ coated with PbO$_2$ was used as an anode, and a stainless steel plate of the same width was used for the counter electrode. The negolyte solution at this time had an initial concentration of Fe(II) of 5000 ppm, and the solution volume was 180 mL. The ratio of Fe(II)/Fe(III) continued to decrease as the reaction time elapsed, indicating that the regeneration was well performed.

At a current of 0.05 mA, Fe(III) was almost completely regenerated under these experimental conditions within 15 hours. At a constant current of 0.01 mA, complete conversion took more than 24 hours (see FIG. 12b). The generation of hydrogen gas in the reaction of 0.05 mA current for 24 hours can be calculated by Faraday's law, and hydrogen gas was obtained at a ratio of $1.38 \times 10^{-7}$ mol/g Fe(II). This can be used as fuel for fuel cells and for electricity production.

(9) Regeneration Test of Fe(III)(4,4'-Dimethyl-2,2'-Bipy)$_3$ Using Solar Cell as External Power In FIG. 13, Ti metal plate with an electrode area of 20 cm$^2$ coated with PbO$_2$ was used as an anode, and a stainless steel plate of the same width was used for the counter electrode. The negolyte solution at this time was Fe(II) with an initial concentration of 5000 ppm and a solution volume of 180 mL.

The ratio of Fe(III)(4,4'-dimethyl-2,2'-bipy)$_3$/Fe(II)(4,4'-dimethyl-2,2'-bipy)$_3$ decreased continuously as the reaction time elapsed, and regeneration was almost completed within 7 hours of reaction time by applying power with a constant current of 0.05 mA (see FIG. 13a).

At 0.01 mA constant current, the reaction rate was slow, and the reaction was not completed even after 24 hours had elapsed. The generation of hydrogen gas in a reaction for 24 hours at a current of 0.05 mA can be calculated using Faraday's law, and hydrogen gas was obtained at a ratio of $1.38 \times 10^{-7}$ mol/g. This can be used as fuel for fuel cells and for electricity production.

(10) Regeneration Test of Fe(III)(PHEN)$_3$ Using Solar Cell as External Power

In FIG. 14, under the same conditions as in FIG. 13, similarly to Fe(III)(2,2'-bipy)$_3$/Fe(II)(2,2'-bipy)$_3$, the ratio of Fe(III)(PHEN)$_3$/Fe(II)(PHEN)$_3$ decreased continuously with the lapse of time, and regeneration was almost completed within 10 hours of reaction time at both constant currents of 0.05 mA and 0.01 mA. The production of hydrogen gas was similar to the test of Fe(III)(4,4'-dimethyl-2,2'-bipy)$_3$/Fe(II)(4,4'-dimethyl-2,2'-bipy)$_3$.

What is claimed is:

1. A microbial fuel cell comprising an anode chamber, a cathode chamber, a separation membrane positioned between the anode chamber and the cathode chamber, and an electrolysis cell,
    wherein the anode chamber comprises an anode on which a microbial film is formed on the surface and an organic solution that is an electron donor as a negolyte, and the organic solution is continuously supplied to the anode chamber,
    the cathode chamber comprises a cathode which is a conductor electrode on which a microbial film is not formed on the surface, and an electron absorber solution as a posolyte,
    the electrolysis cell comprises a cathode and an anode to which power is applied, and the reduced posolyte transferred from the cathode chamber,
    the reduced posolyte transferred from the cathode chamber is regenerated through electrolysis using external power, and the regenerated posolyte is supplied back to the cathode chamber,
    hydrogen gas generated in the cathode chamber due to the electrolysis performed in the electrolysis cell is discharged to the outside of the electrolysis cell and
    the separation membrane is provided with one or more O-rings that can prevent leakage.

2. The microbial fuel cell according to claim 1, wherein the anode chamber and the cathode chamber are two separate regions in an integrated container made of an insulating material and
    the separation membrane is in the form of a window frame, which is pressed and inserted between the anode chamber and the cathode chamber, and is provided with 1 to 3 O-rings.

3. The microbial fuel cell according to claim 1, wherein the anode is selected from the group consisting of carbon brush, carbon felt, carbon plate, carbon plate coated with porous carbon and combinations thereof.

4. The microbial fuel cell according to claim 1, wherein the cathode is selected from the group consisting of carbon brush, carbon felt, carbon plate, carbon plate coated with porous carbon, carbon plate coated with carbon nanotubes, platinum plate, titanium plate, stainless steel plate and combinations thereof.

5. The microbial fuel cell according to claim 1, wherein the anode and cathode are carbon brushes and
    the amount of carbon brush comprised in the cathode chamber is excessive than the amount of carbon brush comprised in the anode chamber.

6. The microbial fuel cell according to claim 1, wherein the separation membrane is a cation exchange membrane, an anion exchange membrane, a cation-anion composite membrane or a microporous membrane.

7. The microbial fuel cell according to claim 1, wherein the organic solution in the anode chamber comprises any one selected from the group consisting of acetate, glucose, protein, hydrolyzate of food, domestic wastewater, anaerobic sludge, algae and combinations thereof.

8. The microbial fuel cell according to claim 1, wherein the electron absorber is selected from Fe(III)(4,4-dimethyl-2,2'-bipyridyl)$_3$, Fe(III)(2,2'-bipyridyl)$_3$, Fe(III)(2,2'-bipyridine-4,4'-disulfonate)$_3$, Fe(III)(2,2'-bipyridine-5-sulfonate)$_3$, Fe(III)(4,4'-bis(triethylammoniummethyl)-2,2'-bipyridine)$_3$, Fe(III)(triethylammonium-2,2'-bipyridine)$_3$, Fe(III)(2,2'-bipyridine-5,5'-dicarboxylic acid)$_3$, Fe(III)(1,10-phen)$_3$, Ru(III)(2,2'-bipyridine)$_3$, Ru(III)(4,4'-bis(triethylammoniummethyl)-2,2'-bipyridine)$_3$, 4-trimethylammonium-2,2,6,6-tetramethylpiperidine-1-oxyl iodide, 2,2,6,6-tetramethylpiperidine-1-oxyl sulfonate, sodium salt, TEMPO-4-sulfate, potassium salt, 4-[3-(trimethylammonium)propoxy]-2,2,6,6-1-oxyl, 2,2,6,6-tetramethylpiperidine-1-oxyl, 4-carboxy-2,2,6,6-tetramethyl tetramethylpiperidine-1-oxyl chloride, (2,2,6,6-tetramethylpiperidine-1-yl)-oxyl copolymer, poly(TEMPO), 4-hydroxy-2,2,6,6-tetramethylpiperidine-1-oxyl, 4-amino-2,2,6,6-tetramethyl piperidine piperidine-1-oxyl, 3-carbamido-2,2,5,5-tetramethyl-3-carbamido-3-pyroline-1-oxyl, phthalimide-N-oxyl, N,N,N-2,2,6,6-heptamethylpiperidine-oxy-4-ammonium dichloride, poly(TEMPO-CO-PEGMA), 4,5-dihydroxy-1,3-benzenedisulfonate, disodium salt, 3,6-dihydroxy-2,4-dimethylbenzenesulfonate, sodium salt, N-hydroxyimide derivatives, (ferrocenylmethyl) trimethylammonium chloride, bis[(trimethylammonium)propyl] ferrocene, bis(3-trimethylaminopropyl)ferrocene dichloride, ferrocene amine chloride, ferrocene dinitrogen dibromide, $Br_2$, $I_3^-$, $Mn^{3+}$ and combinations thereof.

9. The microbial fuel cell according to claim 1, wherein a power applied to the electrolysis cell is selected from the group consisting of power generated from the microbial fuel cell, solar electricity, wind electricity, late-night electricity and combinations thereof.

10. The microbial fuel cell according to claim 1, wherein the electrode of the electrolysis cell comprises
    an anode which is a lead dioxide electrode or a metal coated with lead dioxide; and
    a cathode selected from the group consisting of carbon brush, carbon felt, carbon plate, carbon plate coated with porous carbon, carbon plate coated with carbon nanotubes, platinum plate, titanium plate, stainless steel plate and combinations thereof.

11. The microbial fuel cell according to claim 1, further comprising,
    a posolyte storage unit for accumulating the posolyte regenerated in the electrolysis cell, and supplying the accumulated posolyte to the cathode chamber; and
    a hydrogen gas storage unit for accumulating hydrogen gas generated in the electrolysis cell.

12. A method for producing electrical energy using a microbial fuel cell according to claim 1.

13. The method according to claim 12, wherein the method is performed by connecting a plurality of microbial fuel cells being connected in parallel or in series.

14. The method according to claim 12, wherein the hydrogen gas generated in the electrolysis cell is supplied to the hydrogen-oxygen fuel cell to produce electrical energy additionally.

* * * * *